(12) United States Patent
Hemingway et al.

(10) Patent No.: US 9,488,208 B2
(45) Date of Patent: Nov. 8, 2016

(54) SMART MATERIAL ACTUATED FASTENERS

(71) Applicant: A. RAYMOND ET CIE, Grenoble (FR)

(72) Inventors: Todd L. Hemingway, Metamora, MI (US); Nicholas Jackson, Davisburg, MI (US); Todd Murray, Gaines, MI (US); Walter B. Pipp, Jr., Birmingham, MI (US); Michael Richard Danby, Stoney Creek (CA); Jason F. Reznar, Redford, MI (US)

(73) Assignee: A. Raymond & Cie, Grenoble (FR)

( * ) Notice: Subject to any disclaimer, the term of this patent is extended or adjusted under 35 U.S.C. 154(b) by 99 days.

(21) Appl. No.: 14/029,097

(22) Filed: Sep. 17, 2013

(65) Prior Publication Data

US 2014/0017025 A1 Jan. 16, 2014

Related U.S. Application Data

(63) Continuation of application No. PCT/US2012/028009, filed on Mar. 7, 2012.

(60) Provisional application No. 61/562,158, filed on Nov. 21, 2011, provisional application No. 61/453,597, filed on Mar. 17, 2011.

(51) Int. Cl.
*F16B 1/00* (2006.01)
*F16B 21/00* (2006.01)
*F16B 2/10* (2006.01)
(Continued)

(52) U.S. Cl.
CPC .............. *F16B 21/00* (2013.01); *F16B 1/0014* (2013.01); *F16B 2/10* (2013.01); *F16B 2/12* (2013.01); *F16B 5/0664* (2013.01); *F16B 7/0433* (2013.01); *F16B 19/1081* (2013.01); *F16B 21/082* (2013.01); *F16B 37/04* (2013.01);
(Continued)

(58) Field of Classification Search
CPC ............................ F16B 37/041; F16B 1/0014
USPC .......................................... 411/82.5, 174, 175
See application file for complete search history.

(56) References Cited

U.S. PATENT DOCUMENTS 4,676,706 A * 6/1987 Inaba ............................ 411/175
4,797,513 A 1/1989 Ono et al.
(Continued)

FOREIGN PATENT DOCUMENTS

EP 1634692 A1 3/2006
GB 1548964 A 7/1979
(Continued)

OTHER PUBLICATIONS

Grant, Danny; "Accurate and Rapid Control of Shape Memory Alloy Actuators", Thesis, Department of Electrical and Computer Engineering, McGill University, Oct. 1999, 184 pages.
(Continued)

*Primary Examiner* — Flemming Saether
(74) *Attorney, Agent, or Firm* — Harness, Dickey & Pierce, P.L.C.

(57) ABSTRACT

A smart material actuated fastener is provided. In another aspect, a fastener includes a shape memory material and a non-shape memory material with the shape memory material being a minority of the total fastener materials. A further aspect provides a fastener having workpiece-engaging surfaces made of an inactive and non-shape memory material.

39 Claims, 22 Drawing Sheets

(51) Int. Cl.
| | |
|---|---|
| *F16B 2/12* | (2006.01) |
| *F16B 7/04* | (2006.01) |
| *F16B 19/10* | (2006.01) |
| *F16B 21/08* | (2006.01) |
| *F16B 37/04* | (2006.01) |
| *F16B 41/00* | (2006.01) |
| *H02G 3/32* | (2006.01) |
| *F16B 5/06* | (2006.01) |

(52) U.S. Cl.
CPC ............... *F16B41/002* (2013.01); *H02G 3/32* (2013.01); *F16B 5/065* (2013.01); *F16B 5/0642* (2013.01)

(56) References Cited

U.S. PATENT DOCUMENTS

| | | | |
|---|---|---|---|
| 4,798,507 A * | 1/1989 | Olah | 411/175 |
| 4,841,100 A | 6/1989 | Ignasiak | |
| 4,883,397 A * | 11/1989 | Dubost | 411/174 |
| 5,108,214 A * | 4/1992 | Milam | 403/28 |
| 5,134,812 A * | 8/1992 | Hoffman et al. | 52/1 |
| 5,423,646 A * | 6/1995 | Gagnon | 411/184 |
| 5,727,391 A | 3/1998 | Hayward et al. | |
| 6,348,064 B1 * | 2/2002 | Kanner | 606/219 |
| 6,357,980 B1 * | 3/2002 | Lansinger | 411/174 |
| 6,422,797 B2 * | 7/2002 | Pas | 412/33 |
| 6,474,917 B2 * | 11/2002 | Gauron | 411/112 |
| 6,759,481 B2 | 7/2004 | Tong | |
| 6,986,855 B1 | 1/2006 | Hood et al. | |
| 7,276,195 B1 | 10/2007 | Tong | |
| 7,422,714 B1 | 9/2008 | Hood et al. | |
| 7,600,301 B2 * | 10/2009 | Rudduck et al. | 24/606 |
| 7,922,207 B2 * | 4/2011 | Hoarau et al. | 281/21.1 |
| 8,066,462 B2 * | 11/2011 | Rudduck et al. | 411/360 |
| 2005/0263222 A1 | 12/2005 | Harchekar et al. | |
| 2006/0202512 A1 | 9/2006 | Brei et al. | |
| 2007/0044868 A1 | 3/2007 | Yamauchi et al. | |
| 2007/0071575 A1 | 3/2007 | Rudduck et al. | |
| 2008/0095592 A1 | 4/2008 | Spitz | |
| 2008/0197674 A1 | 8/2008 | Browne et al. | |
| 2008/0251044 A1 | 10/2008 | Riley et al. | |
| 2008/0251746 A1 | 10/2008 | Riley et al. | |
| 2009/0066531 A1 | 3/2009 | Boubtane et al. | |
| 2009/0191025 A1 | 7/2009 | Jackson, Jr. | |
| 2009/0235494 A1 | 9/2009 | Browne et al. | |
| 2010/0098515 A1 | 4/2010 | Raymond | |
| 2010/0154181 A1 * | 6/2010 | Flanigan et al. | 24/453 |
| 2011/0311331 A1 * | 12/2011 | Tejero Salinero | 411/175 |

FOREIGN PATENT DOCUMENTS

| | | | |
|---|---|---|---|
| JP | H01200515 A | 8/1989 | |
| JP | H02158784 A | 6/1990 | |
| JP | H02163594 A | 6/1990 | |
| JP | H04300489 A | 10/1992 | |
| JP | H08177817 A | 7/1996 | |
| JP | 2003-145564 A | 5/2003 | |
| JP | 2006-183827 A | 7/2006 | |
| WO | WO-2004/062416 A1 | 7/2004 | |
| WO | WO-2004/098864 A1 | 11/2004 | |
| WO | WO-2008/129241 A1 | 10/2008 | |

OTHER PUBLICATIONS

"Fasteners Get Smart", Society of Manufacturing Engineering, Jan. 2004, two pages.

Wilson, Rob; "Fascinating fasteners: Telezygology and Textron team up to usher in the new age of point and joint—Textron Fastening Systems", Automotive Industries, Jan. 2004, two pages.

Toensmeier, Patrick A.; "Shape memory polymers reshape product design", Plastics Engineering, Society of Plastics Engineers, Mar. 2005, four pages.

Mohr, R, et al.; "Initiation of shape-memory effect by inductive heating of magnetic nanoparticles in thermoplastic polymers", PNAS, vol. 103, No. 10, Mar. 7, 2006, pp. 3540-3545.

Bellin, I, et al.; "Polymeric triple-shape materials", PNAS, vol. 103, No. 48, Nov. 28, 2006, pp. 18043-18047.

Product Data Sheet: "Essemplex™ Thermoplastic Shape Memory Polymer Resin", CRG Industries, 2007, two pages.

Brochure: "Shape memory polymers detect changes in tempterature or light level", Sandia National Laboratories, Jun. 2007, two pages.

Specification: "CRG Industries launch Essemplex, a Thermoplastic Shape Memory Polymer (SMP) Resin", SpecialChem, CRG Industries LLC, Jul. 2, 2009, one page.

"Essemplex™", CRG Industries, LLC, http://www.crg-industries.com/essemplex.htm, printed Jul. 20, 2009, two pages.

"Shape memory polymer", Wikipedia, http://www.answers.com/topic/shape-memory-polymers?&print=true, printed Feb. 1, 2011, nine pages.

* cited by examiner

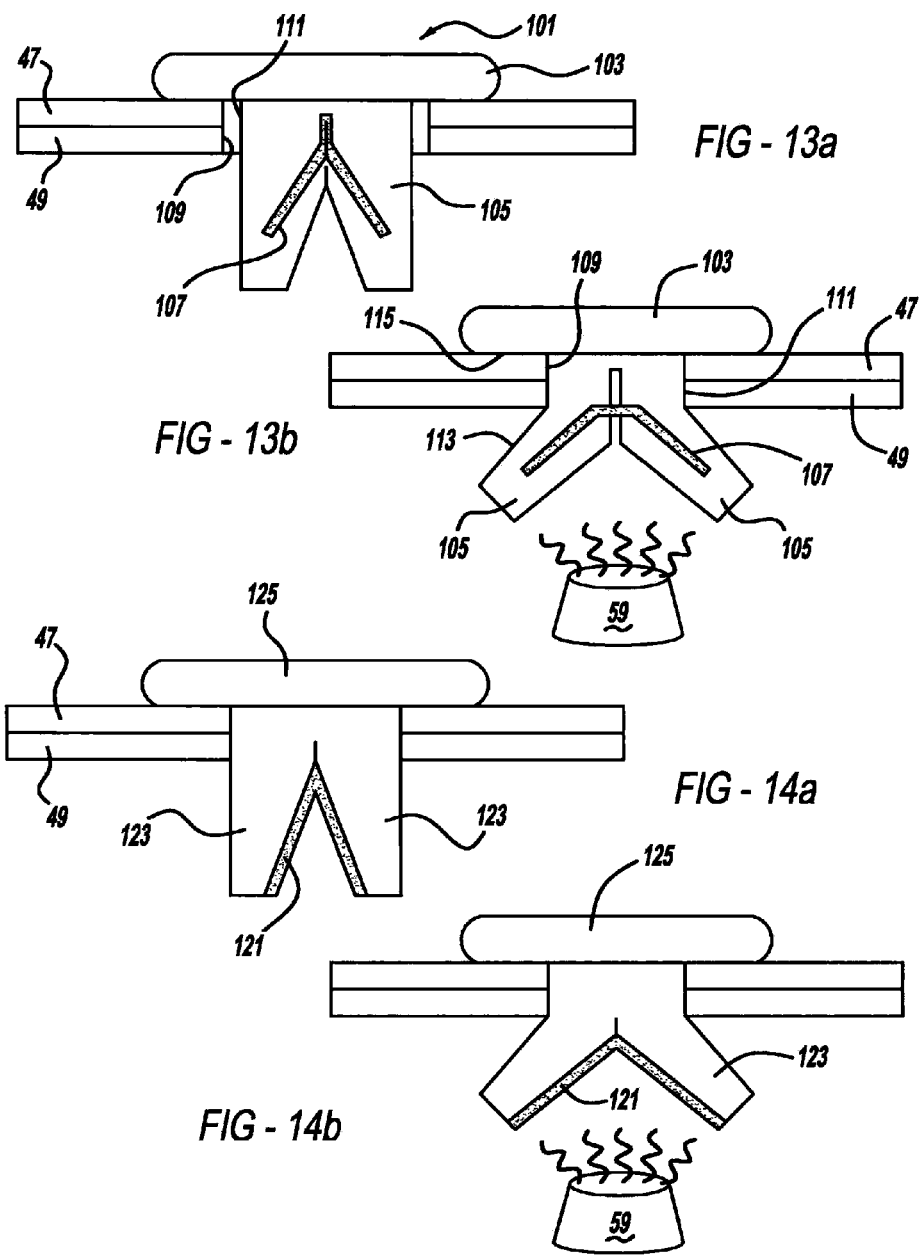

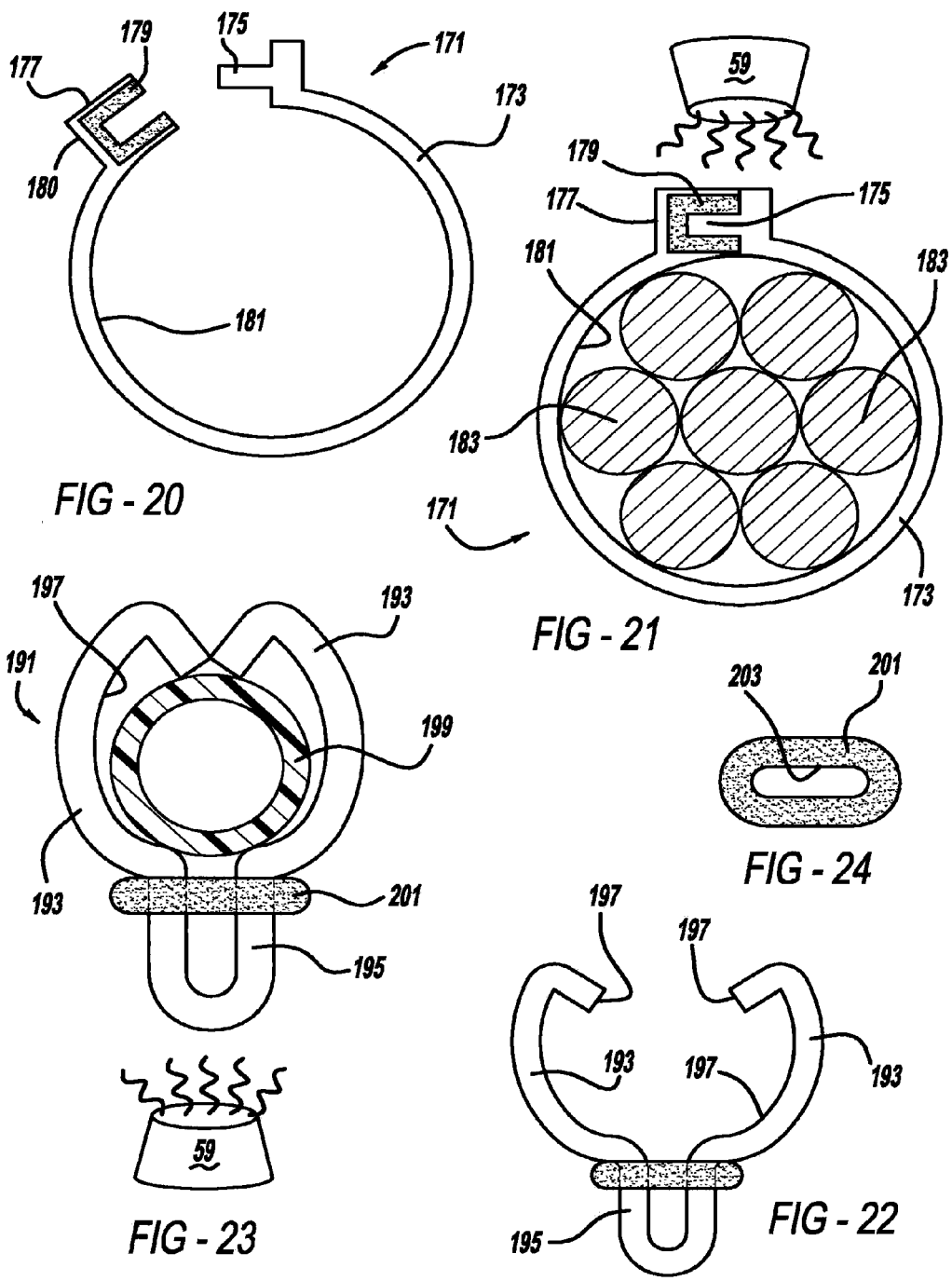

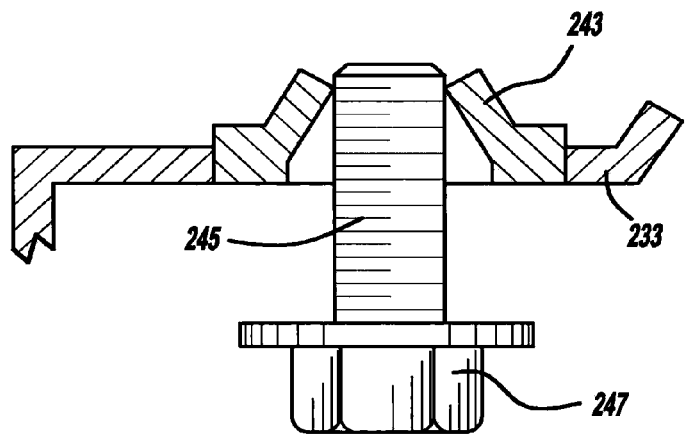
*FIG - 29*
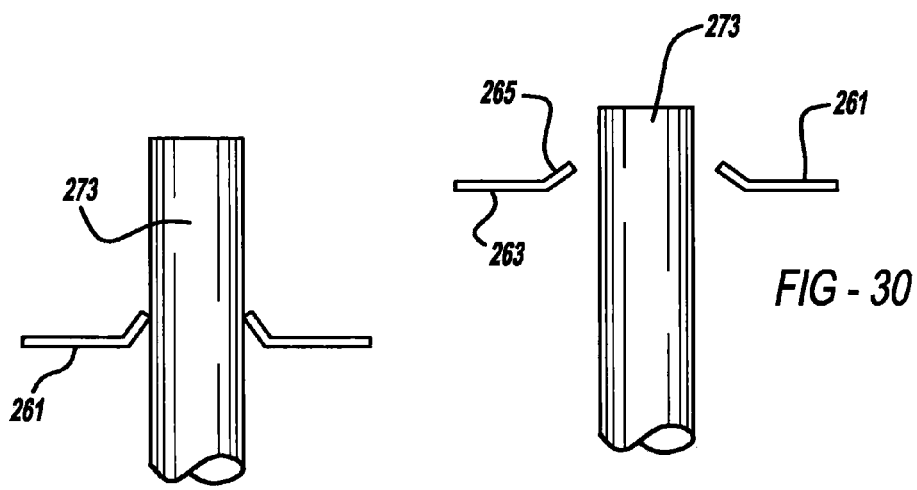
*FIG - 30*
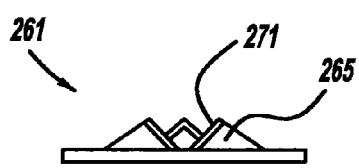
*FIG - 31*
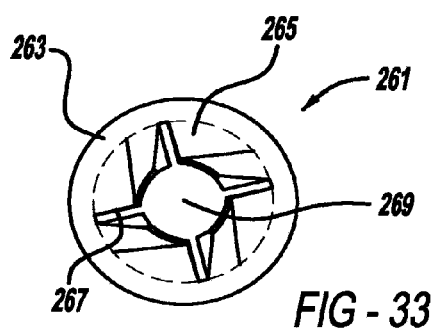
*FIG - 32*
*FIG - 33*

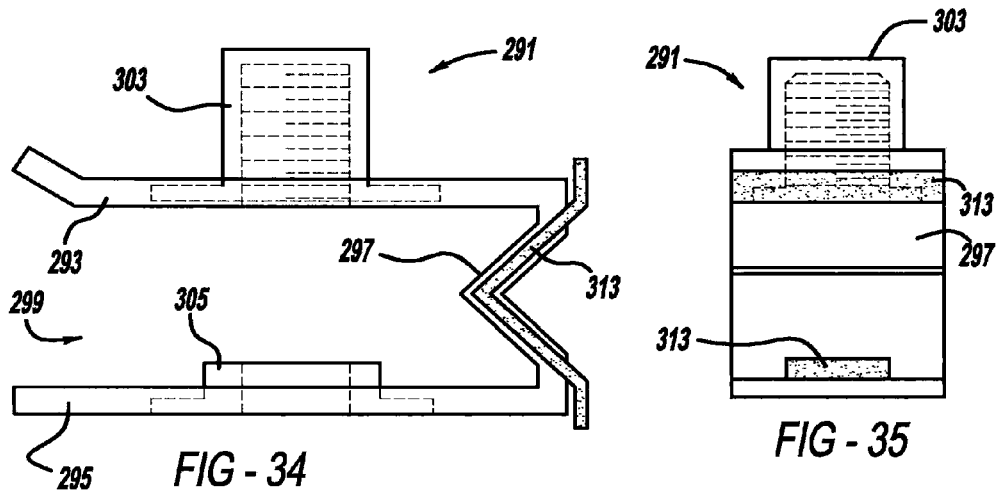
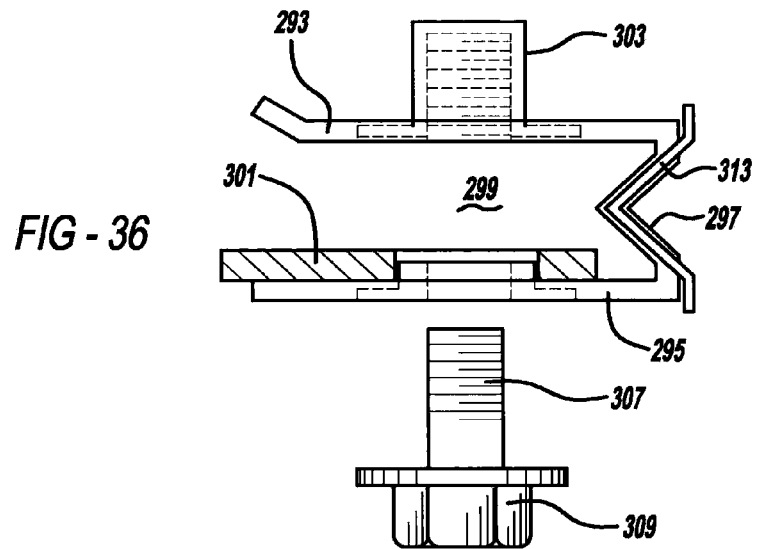
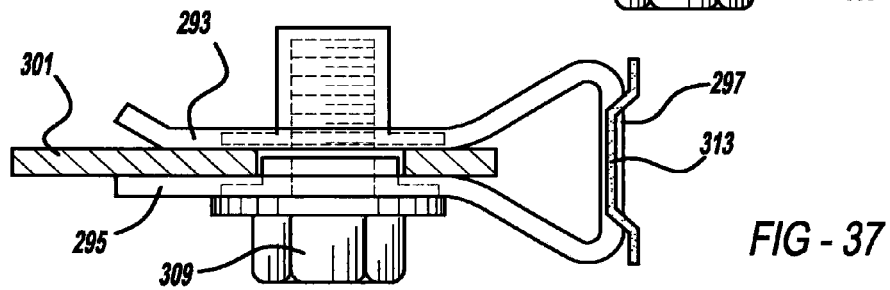

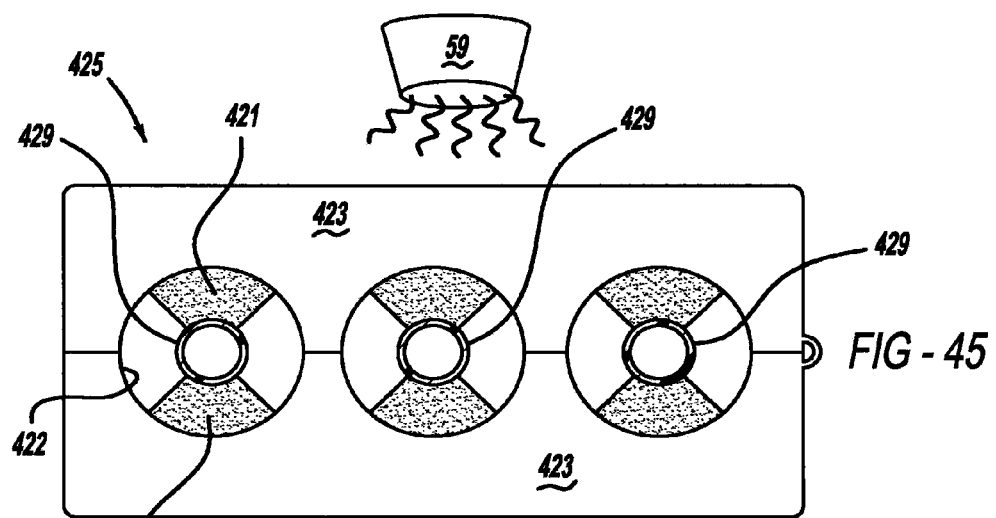
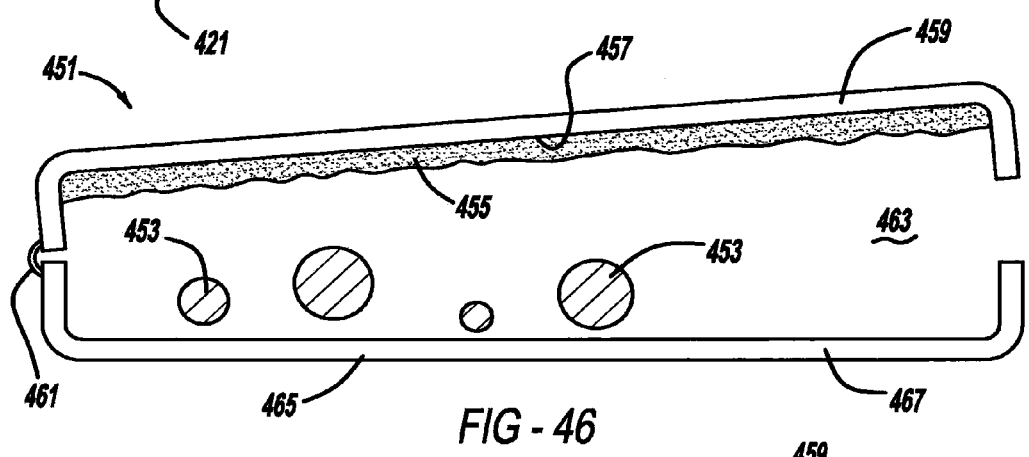
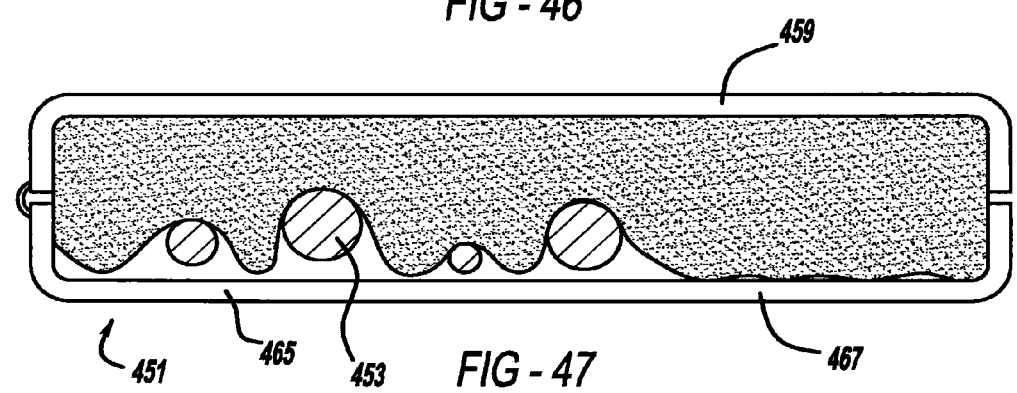

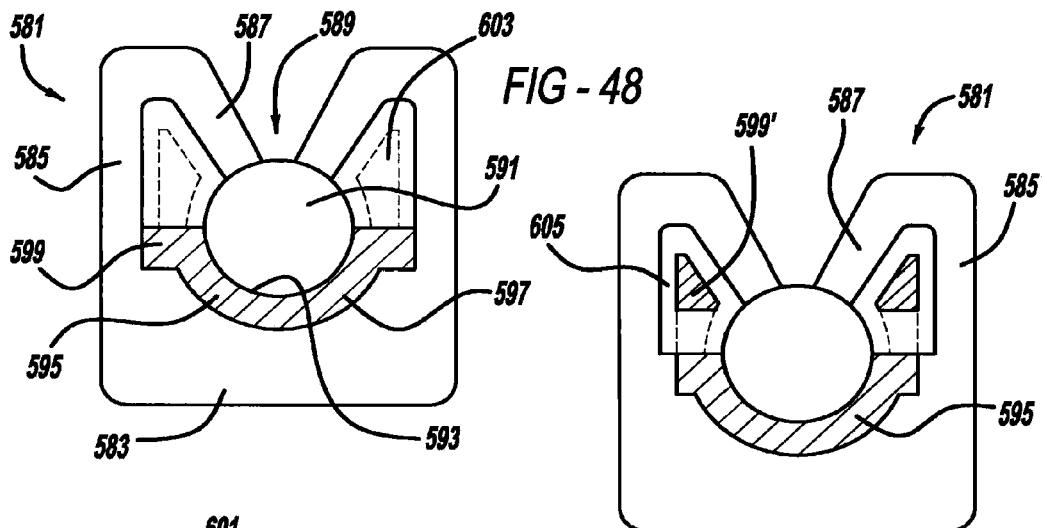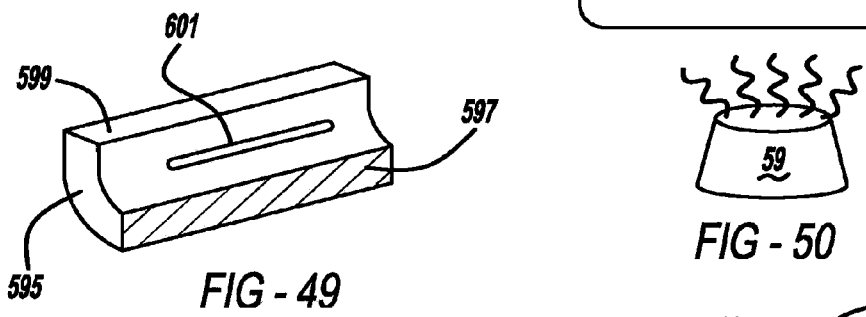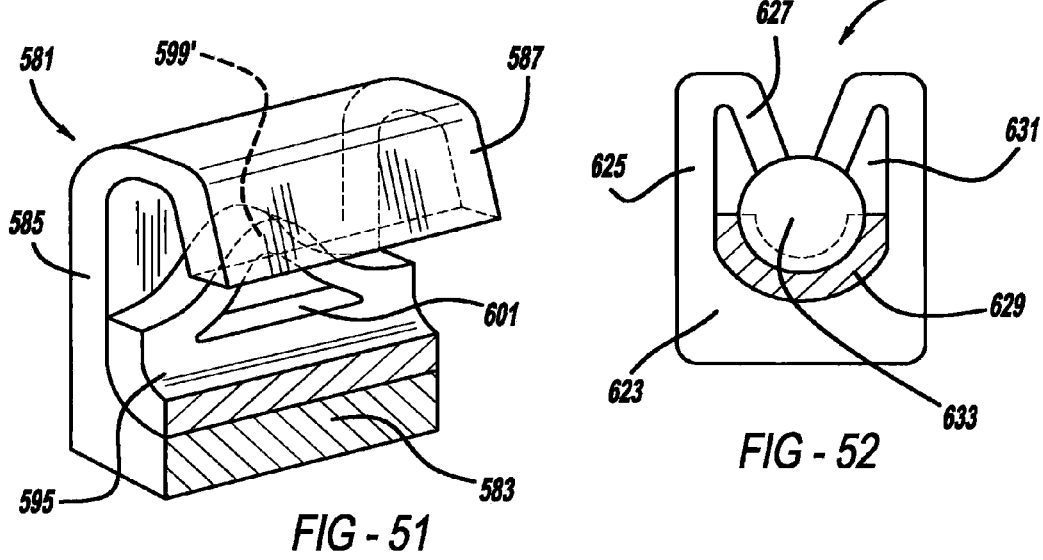

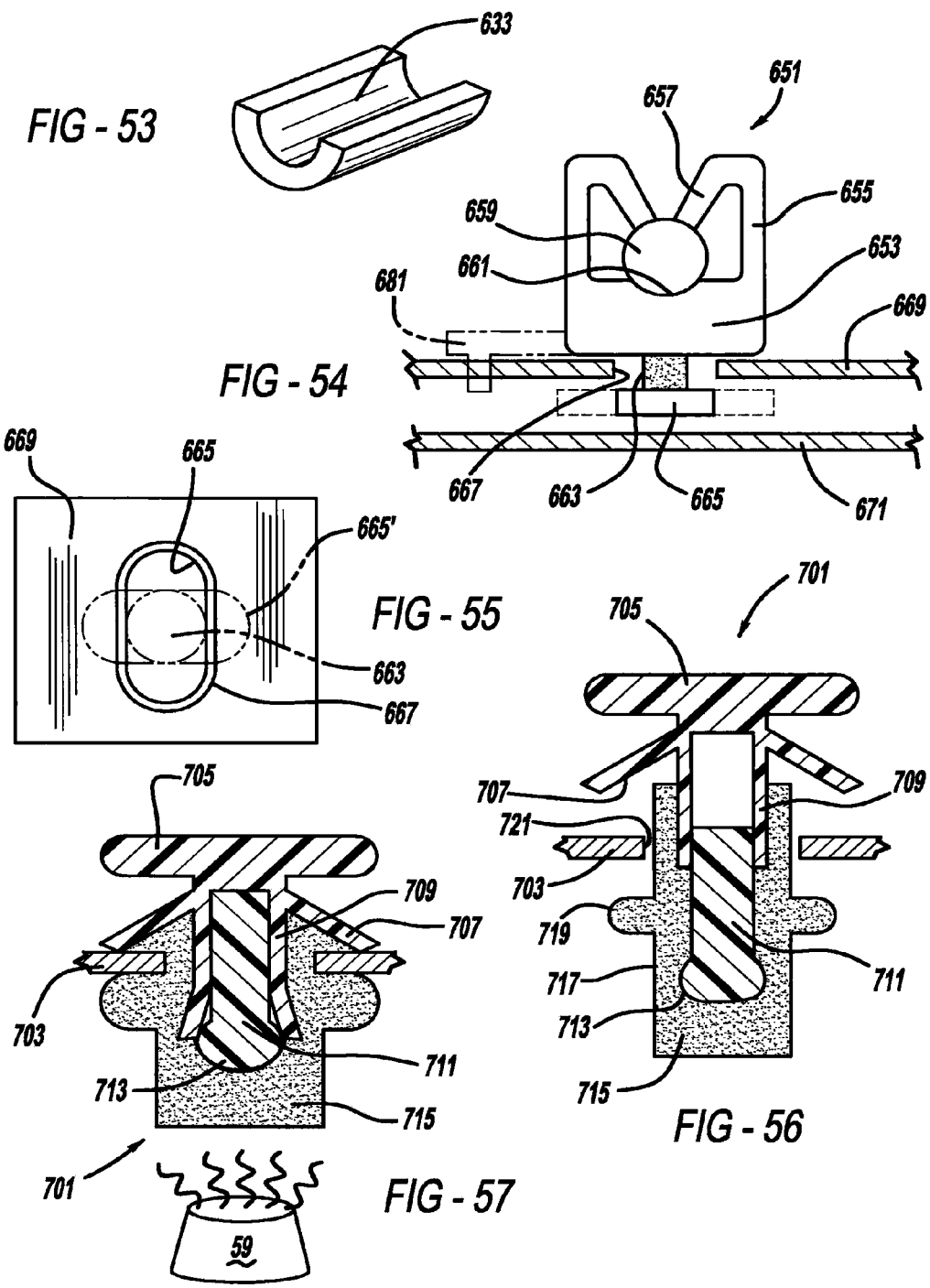

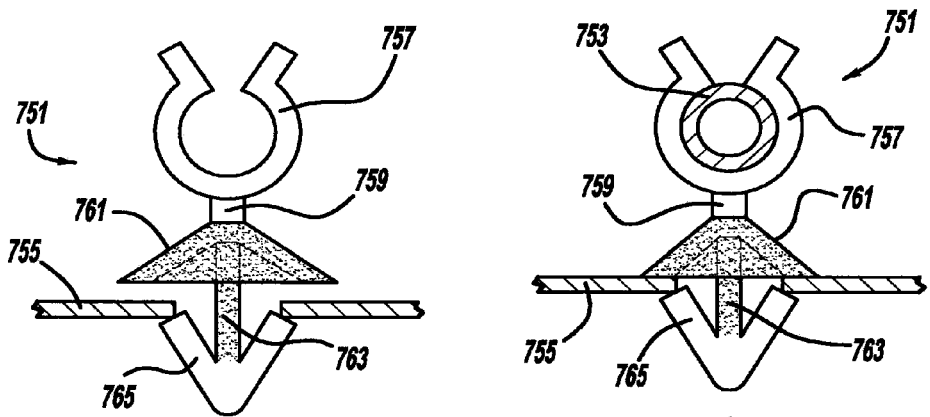
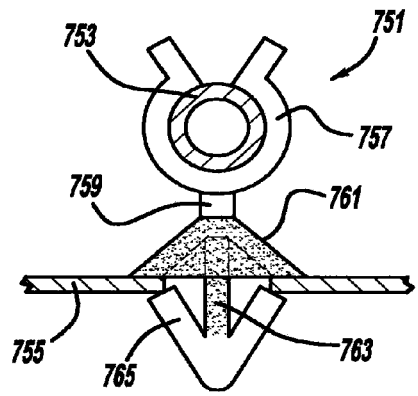
*FIG - 58*
*FIG - 59*
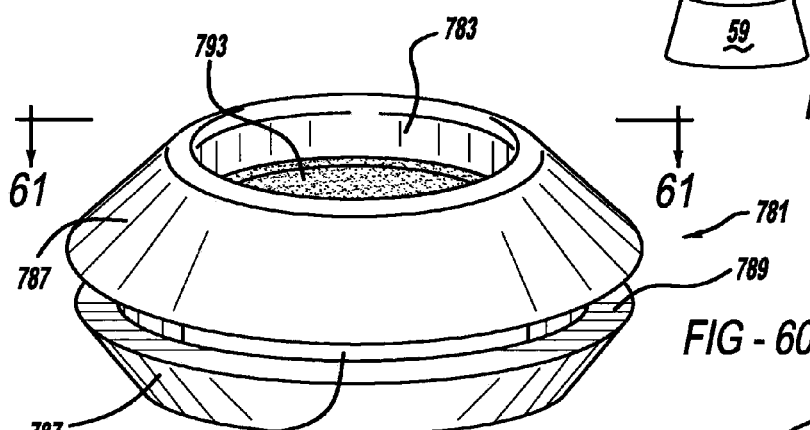
*FIG - 60*
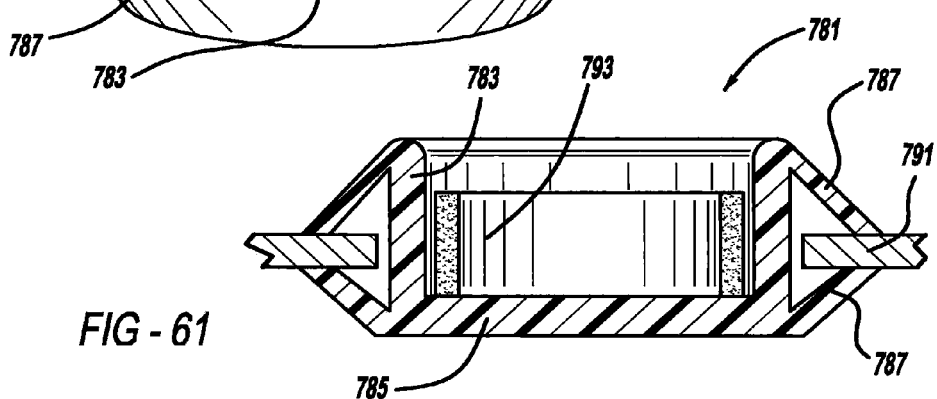
*FIG - 61*

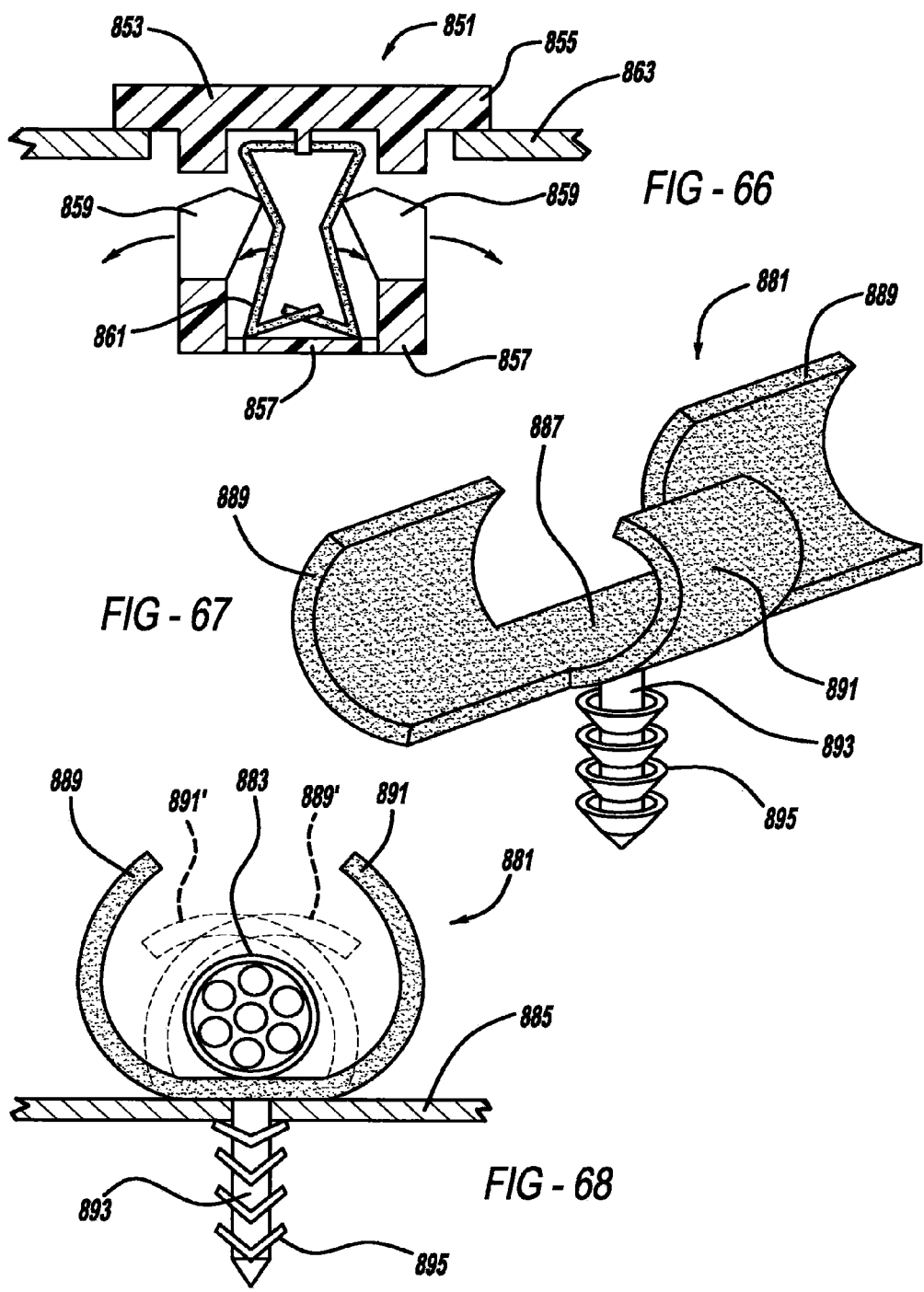

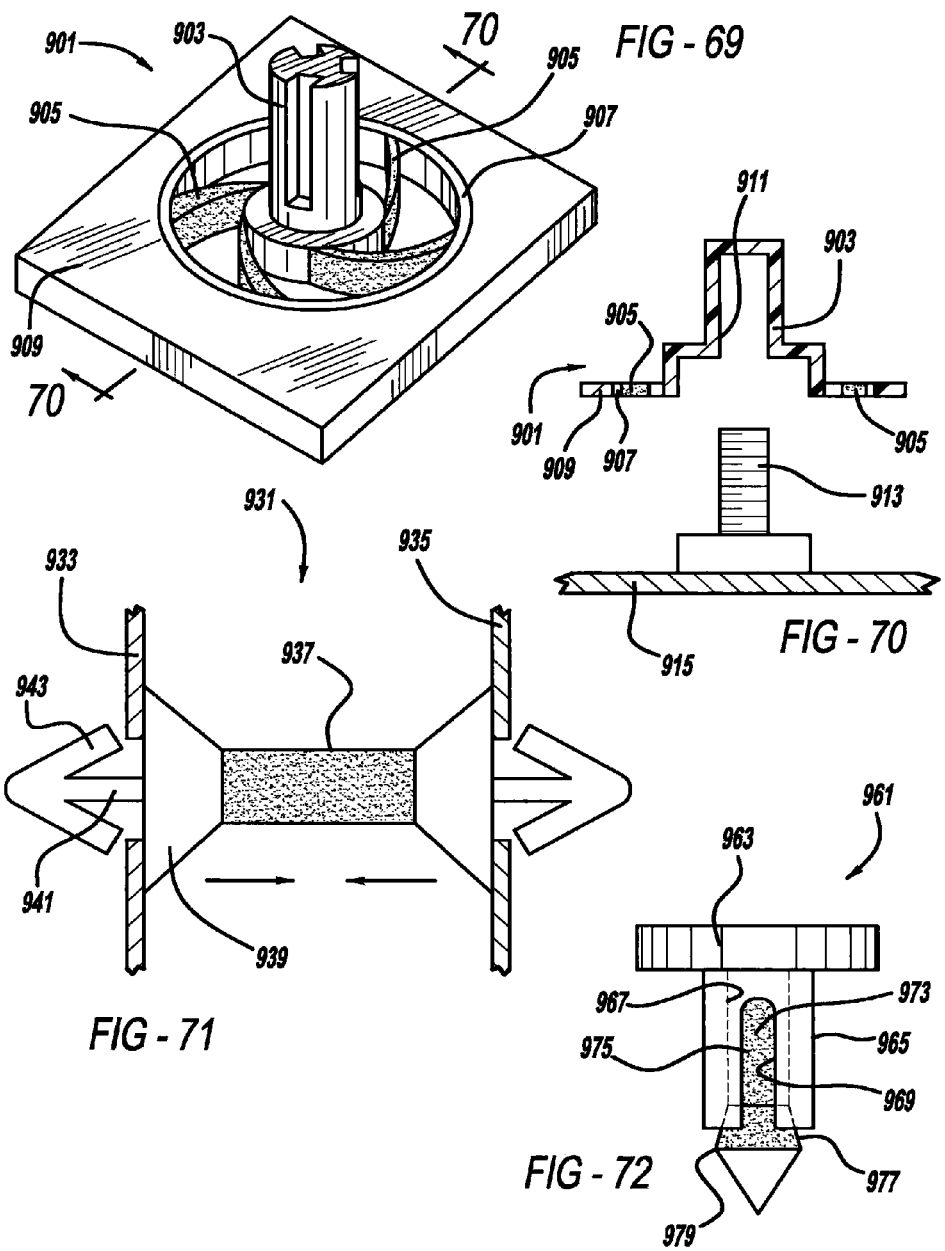

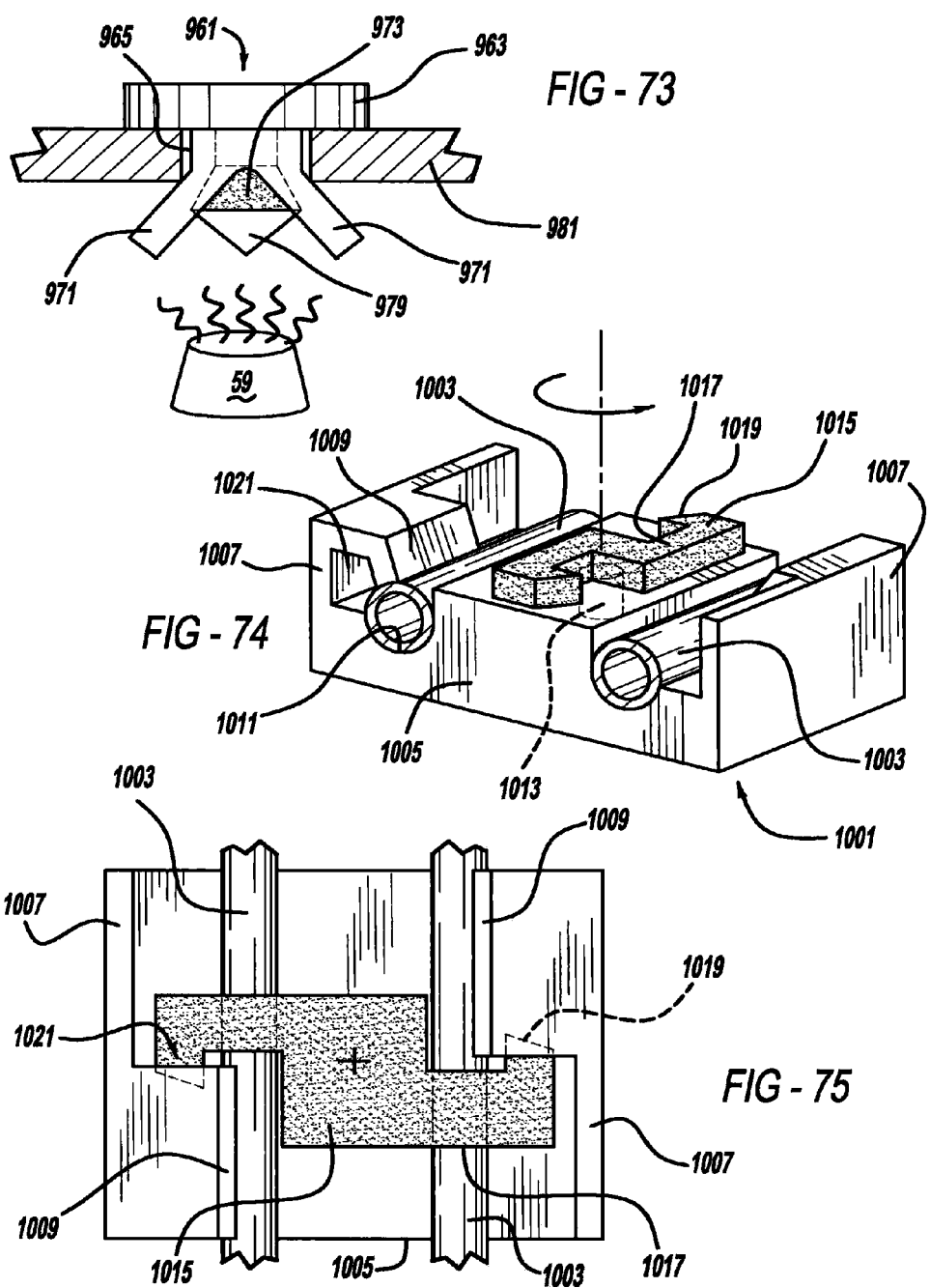

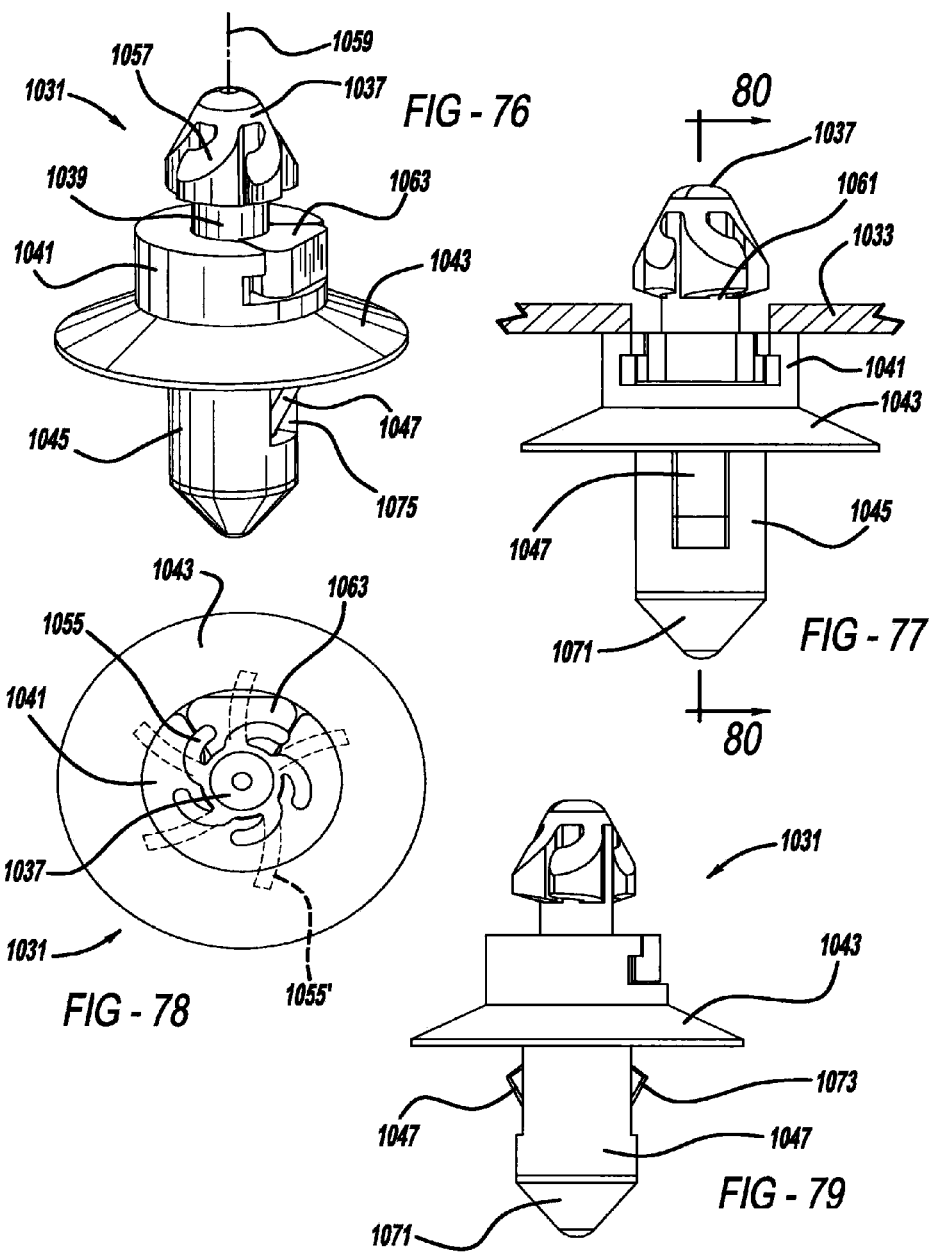

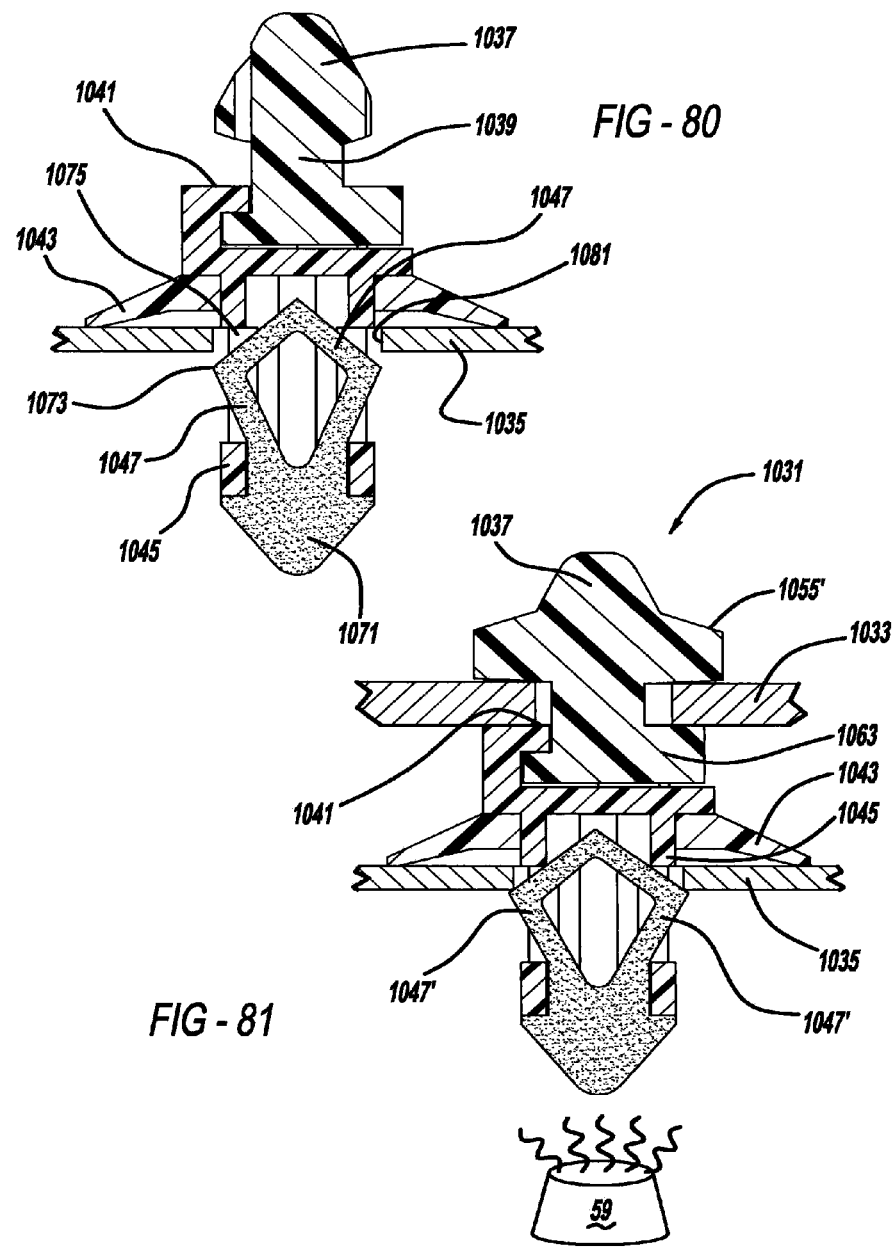

SMART MATERIAL ACTUATED FASTENERS

CROSS-REFERENCE TO RELATED APPLICATIONS

The present application is a continuation of PCT International Patent Application Serial No. PCT/US2012/028009, filed on Mar. 7, 2012, which claims priority to U.S. Provisional Application Ser. No. 61/562,158, filed on Nov. 21, 2011 and U.S. Provisional Application Ser. No. 61/453,597, filed on Mar. 17, 2011, all of which are incorporated by reference herein.

BACKGROUND AND SUMMARY

The present invention relates generally to fasteners and more particularly to a smart material actuated fastener.

Recently, some researchers have theoretically disclosed the use of shape memory polymers for fasteners. For example, reference should be made to U.S. Patent Publication No. 2010/0154181 entitled "Shape Memory Fastener" published on Jun. 24, 2010, and U.S. Patent Publication No. 2009/0235494 entitled "Active Material Based Fasteners Including Cable Ties and Twist Ties" which published on Sep. 24, 2009, both of which are incorporated by reference herein. It is noteworthy, however, that the fasteners of most of the disclosed concepts are entirely made of the shape memory polymeric material. This is extremely disadvantageous from a practical standpoint due to the very high cost of the shape memory polymers and due to the likely fastening performance degradation thereof.

In accordance with the present invention, a smart material actuated fastener is provided. In another aspect, a fastener includes a shape memory material and a non-shape memory material with the shape memory material being a minority of the total fastener materials. A further aspect provides a fastener having workpiece-engaging surfaces made of an inactive and non-shape memory material. Still another aspect of the present fastener includes legs which are moved in response to an energization change of a shape memory material. In another aspect, at least a portion of a shape memory material is internally located and/or insert molded within an inactive material. Still another aspect employs a fastener assembly with a generally rigid segment having a curved surface or cavity which secures an elongated tube, wire or other component workpiece thereagainst with the assistance of a shape memory material.

The present invention fastener is advantageous over prior devices such that the shape memory material allows for more secure attachment and fastening of the present fastener to the workpiece(s) but without greatly increasing the part expense. Additionally, the present fastener advantageously uses conventional polymeric or metallic materials, which are inactive upon energization, on workpiece-engaging surfaces to obtain the workpiece insertion and extraction forces required but while also providing an actuation force with a shape memory or active material in a portion of the fastener which is not directly interfacing with the workpiece and/or in a location which is more tolerant of the performance characteristics unique to such shape memory materials. Additional advantages and features of the present invention will become apparent from the following description and appended claims taken in conjunction with the accompanying drawings.

BRIEF DESCRIPTION OF THE DRAWINGS

FIG. 13*a* is a diagrammatic side view showing another embodiment fastener of the present invention inserted in workpieces;

FIG. 13*b* is a diagrammatic side view of the fastener of FIG. 13*a* in an actuated and workpiece-engaging condition;

FIG. 14*a* shows another embodiment fastener of the present invention inserted in workpieces;

FIG. 14*b* is a diagrammatic side view showing the fastener of FIG. 14*a* in an actuated and workpiece-engaging condition;

FIG. 20 is a diagrammatic side view showing another embodiment fastener of the present invention in an open position;

FIG. 21 is a diagrammatic side view showing the fastener of FIG. 20 in an actuated, closed and workpiece-engaging condition;

FIG. 22 is a diagrammatic side view showing another embodiment fastener of the present invention in an open condition;

FIG. 23 is a diagrammatic side view showing the fastener of FIG. 22 in an actuated, closed and workpiece-engaging condition;

FIG. 24 is a diagrammatic top view showing a shape memory material employed with the fastener of FIG. 22;

FIG. 29 is an enlarged and cross-sectional view like that of FIG. 28 in an actuated and bolt-engaging condition;

FIG. 30 is a diagrammatic side view of another embodiment fastener of the present invention with a post inserted therein;

FIG. 31 is a diagrammatic side view showing the fastener of FIG. 30 in an actuated and post-engaging condition;

FIG. 32 is a side elevational view showing the fastener of FIG. 30;

FIG. 33 is a top elevational view showing the fastener of FIG. 30;

FIG. 34 is a diagrammatic side view showing another embodiment fastener of the present invention;

FIG. 35 is a diagrammatic end view showing the fastener of FIG. 34;

FIG. 36 is a diagrammatic side view showing the fastener of FIG. 34 with a workpiece inserted therein and a bolt exploded therefrom;

FIG. 37 is a diagrammatic side view showing the fastener of FIG. 34 in an actuated and workpiece-engaging condition;

FIG. 45 is a diagrammatic side view showing the fastener of FIG. 44 in an actuated and workpiece-engaging condition;

FIG. 46 is a diagrammatic side view showing another embodiment fastener of the present invention with workpieces inserted therein;

FIG. 47 is a diagrammatic side view showing the fastener of FIG. 46 in an actuated and workpiece-engaging condition;

FIG. 48 is a diagrammatic side view showing another embodiment fastener of the present invention with a workpiece inserted therein, in a relaxed state;

FIG. 49 is a fragmentary perspective view showing an active material portion of the fastener of FIG. 48, in the relaxed state;

FIG. 50 is a diagrammatic side view showing the fastener of FIG. 48, in an activated state;

FIG. 51 is a fragmentary perspective view showing the fastener of FIG. 48, in the activated state;

FIG. 52 is a diagrammatic side view showing another embodiment fastener, in a relaxed state;

FIG. 53 is a perspective view showing an active material portion of the fastener of FIG. 52, in a relaxed state;

FIG. 54 is a diagrammatic side view showing another embodiment fastener of the present invention;

FIG. 55 is a diagrammatic bottom view showing the fastener of FIG. 54;

FIG. 56 is a cross-sectional view showing another embodiment fastener of the present invention, in a relaxed state;

FIG. 57 is a cross-sectional view of the fastener of FIG. 56, in an activated state;

FIG. 58 is a side elevational view showing another embodiment fastener of the present invention, in a relaxed state;

FIG. 59 is a side elevational view showing the fastener of FIG. 58, in an activated state;

FIG. 60 is a perspective view of another embodiment fastener of the present invention;

FIG. 61 is a cross-sectional view, taken along line 61-61 of FIG. 60, showing the fastener, in a relaxed state;

FIG. 66 is a cross-sectional view showing another embodiment fastener of the present invention, in a relaxed state;

FIG. 67 is a perspective view showing another embodiment fastener of the present invention, in a relaxed state;

FIG. 68 is a side elevational view showing the fastener of FIG. 67, in relaxed and activated states;

FIG. 69 is a perspective view showing another embodiment fastener of the present invention;

FIG. 70 is a cross-sectional view, taken along line 70-70 of FIG. 69, showing the fastener;

FIG. 71 is a side elevational view showing another embodiment fastener of the present invention, in a relaxed state;

FIG. 72 is a side elevational view showing another embodiment fastener of the present invention, in a relaxed state;

FIG. 73 is a side elevational view showing the fastener of FIG. 72, in an activated state;

FIG. 74 is a perspective view showing another embodiment fastener of the present invention, in a relaxed state;

FIG. 75 is a top elevational view showing the fastener of FIG. 74, in an activated state;

FIG. 76 is a perspective view showing another embodiment fastener of the present invention, in an activated state;

FIG. 77 is a side elevational view showing the fastener of FIG. 76;

FIG. 78 is a top elevational view showing the fastener of FIG. 76;

FIG. 79 is a side elevational view, taken 90° from that of FIG. 77, showing the fastener, in an activated state;

FIG. 80 is a cross-sectional view, taken along line 80-80 of FIG. 77, showing the fastener, in a relaxed state; and FIG. 81 is a cross-sectional view like that of FIG. 80, showing the fastener, in an activated state.

DETAILED DESCRIPTION

Figure 1:
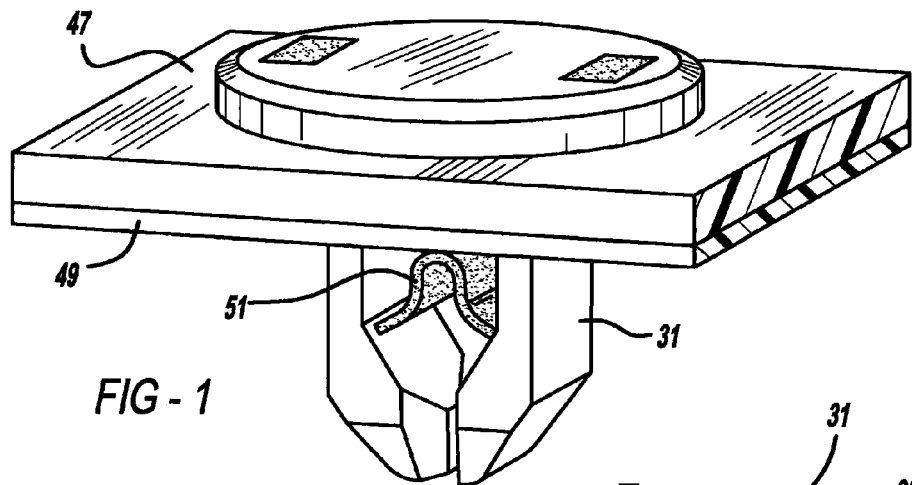
FIG. 1 is a perspective view showing an embodiment of a fastener of the present invention inserted in workpieces.
Figure 2:
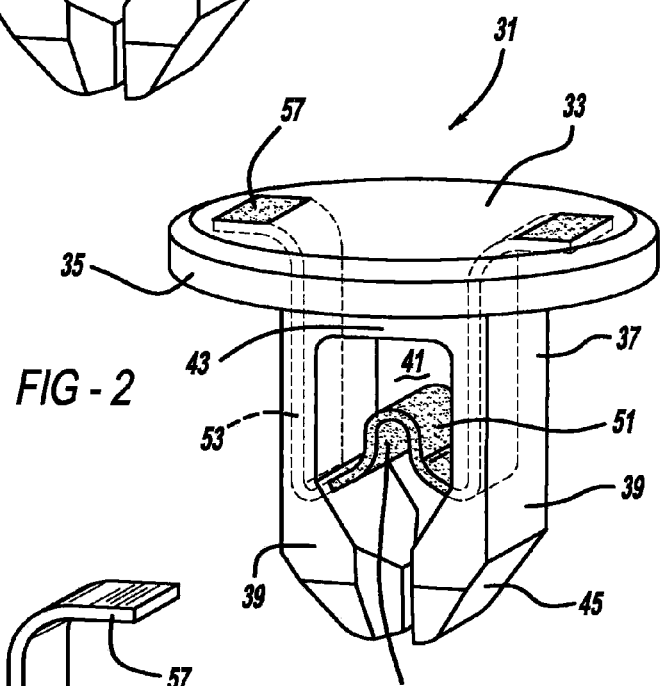
FIG. 2 is a perspective view showing the fastener of FIG. 1.
Figure 3:
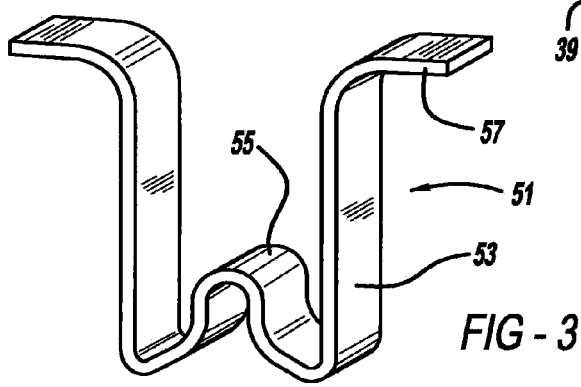
FIG. 3 is a perspective view showing a shape memory material of the fastener of FIG. 1.
Figure 4:
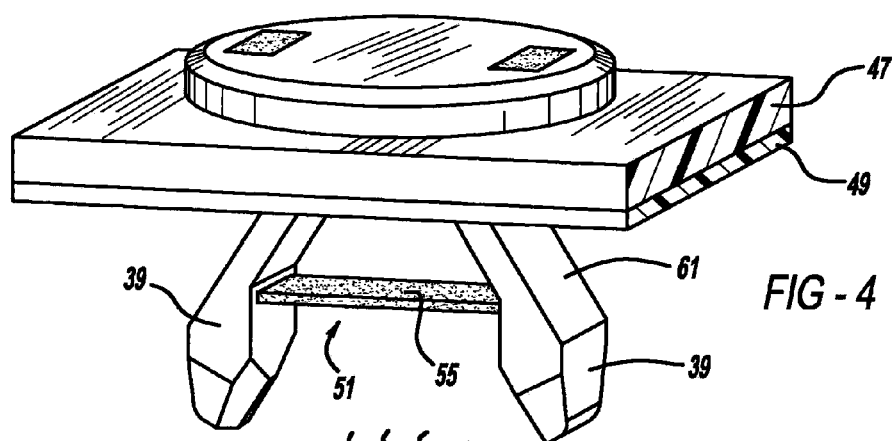
FIG. 4 is a perspective view showing the fastener of FIG. 1 in an actuated and workpiece-engaging condition.
Figure 5:
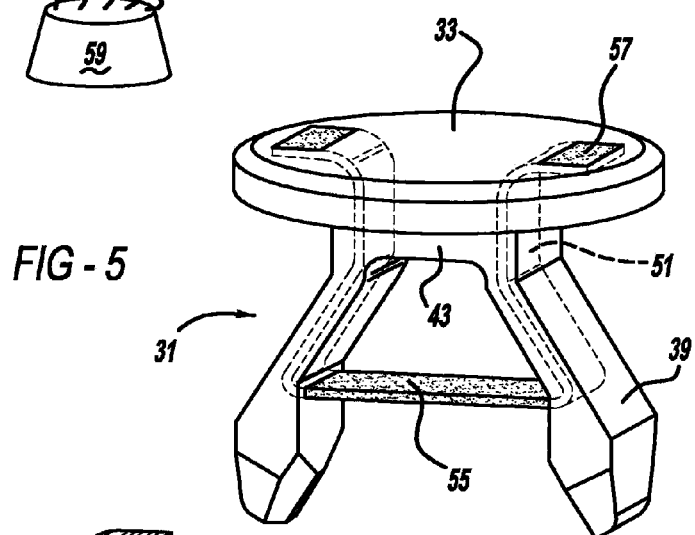
FIG. 5 is a perspective view showing the fastener of FIG. 1 in the actuated condition.
Figure 6:
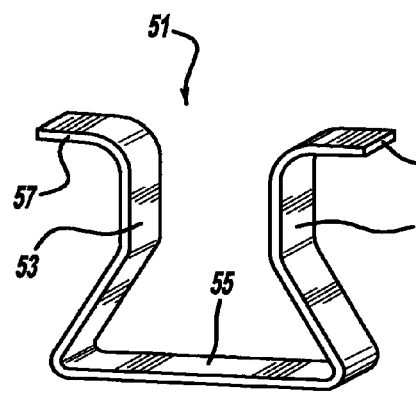
FIG. 6 is a perspective view showing the shape memory material employed in the fastener of FIG. 1 in the actuated condition.

An embodiment of a smart material actuated fastener 31 is shown in FIGS. 1-6. Fastener 31 includes a laterally enlarged head 33 with a generally circular periphery 35. A stem 37 longitudinally projects from head 33 in a generally perpendicular manner to the laterally enlarged direction. Stem 37 includes at least two flexible legs 39 separated by a longitudinally extending gap 41. Legs 39 are optionally joined at an intermediate waist section 43. Tapered distal ends 45 of legs 39 provide a lead-in point to assist insertion of the nominal and free position fastener (as shown in FIGS. 1 and 2) into a hole within a pair of workpieces 47 and 49. Workpieces 47 and 49 are preferably automotive vehicular panels such as stamped sheet metal panels, interior trim panels, an instrument panel, components or the like. The fastener can attach to one or more of the workpieces depending on the specific use.

A smart or active material member or actuator 51 is insert molded into an inactive polymeric resin during an injection molding process to create fastener 31. In this embodiment, smart material member 51 is preferably a stamped, shape memory metallic alloy which has a generally W-shape in its free and unactuated condition, defined by a total length at least twice, and more preferably at least four times as long as width and thickness dimensions. Upstanding outer segments 53 of smart material member 51 are entirely internal within the inactive polymer of legs 39 and a bridging segment 55 is externally exposed as it extends between legs 39 within gap 41. Turned end segments 57 of smart material member 51 are preferably exposed at a top surface of head 33 to assist in locating the smart material member when it is placed against an injection mold during insert molding, but ends 57 may alternately be entirely encapsulated within the inactive polymer of head 33.

When in its nominal, free and unactuated condition, smart material 51 has a folded over configuration such that legs 39 have their naturally molded, longitudinally projecting orientation. When an external energy source 59, such as an electrode gun, energizes smart material member 51, bridging segment 55 returns to its initial preformed "memory" orientation, which in this embodiment is straight. Therefore, when actuated, bridging segment 55 of smart material member 51 outwardly biases legs 39 and causes workpiece-engaging external surfaces 61 thereof to contact against a bottom surface of workpieces 47 and 49 while firmly securing a workpiece-engaging bottom surface of head 33 against an opposite outer surface of workpieces 47 and 49.

In this embodiment it is noteworthy that smart material member 51 is spaced away from the workpiece-engaging surfaces of the fastener. This allows the inactive polymeric material to beneficially meet its flexibility, tensile strength, color matching, ultraviolet light resistance, tolerance consistency and other such critical workpiece-to-fastener performance characteristics without degradation due to the different performance characteristics of the shape memory material. Furthermore, the smart material constitutes a minority, and preferably less than twenty-five percent, of the weight and/or volume of the total fastener. This reduces the total material cost of the fastener. Therefore, the specified combination of smart and inactive materials creates synergistic functional and economic benefits.

The injection molded portion of fastener 31 is preferably made of a polymeric resin which is a non-shape memory material, essentially inactive when acted upon by energization source 59. Exemplary inactive polymeric materials include and are not limited to polypropylene, acrylonitrile butadiene styrene (ABS), nylon, acetel, polyester, thermoplastic elastomer, and variations thereof whether filled or unfilled.

Nonlimiting and exemplary shape memory metallic alloys for smart member 51 can be found in the following U.S. Patent Publication Nos.: 2007/0044868 entitled "Ti-Based Shape Memory Alloy Article" which was published on Mar. 1, 2007; and 2005/0263222 entitled "Cu—Zn—Al(6%) Shape Memory Alloy with Low Martensitic Temperature and a Process for its Manufacture" which published on Dec. 1, 2005; both of which are incorporated by reference herein. Alternately, the shape memory material can be a shape memory polymer such as that disclosed in U.S. Pat. No. 7,276,195 entitled "Maleimide Based High Temperature Shaped Memory Polymers" which issued to Tong on Oct. 2, 2007, which is incorporated by reference herein. The activation energy may take the form of thermal changes, photons (e.g., from a laser), vibrations, electrical current, microwaves, or the like. This energization is performed in a generally non-contact manner such that no deformation through contact is created to actuate the smart member; in other words, no physical bending, pinching or direct mechanical type action due to tools (e.g., hammers, pliers, presses or punches) are acting upon the smart member to actuate it.

FIGS. 7-12 illustrate another embodiment of the smart material actuated fastener. This exemplary fastener 71 includes a head 73 and a stem defined by a pair of longitudinally extending legs 75. A generally U-shaped (in a free state) smart material member or actuator 77 is insert molded within head and legs 73 and 75, respectively. A pair of transversely extending notches 79 are positioned at a trough segment 81 of smart member 77. Outwardly turned end segments 83, a middle area of upstanding segments 85 and trough segment 81 are externally visible from the final molded fastener while the remainder of smart member 77 is internally hidden and encapsulated within the inactive majority material of fastener 71. Again, smart member 77 is preferably a shape memory metallic alloy while the remainder of fastener is injection molded and inactive polymeric resin.

Figure 7:
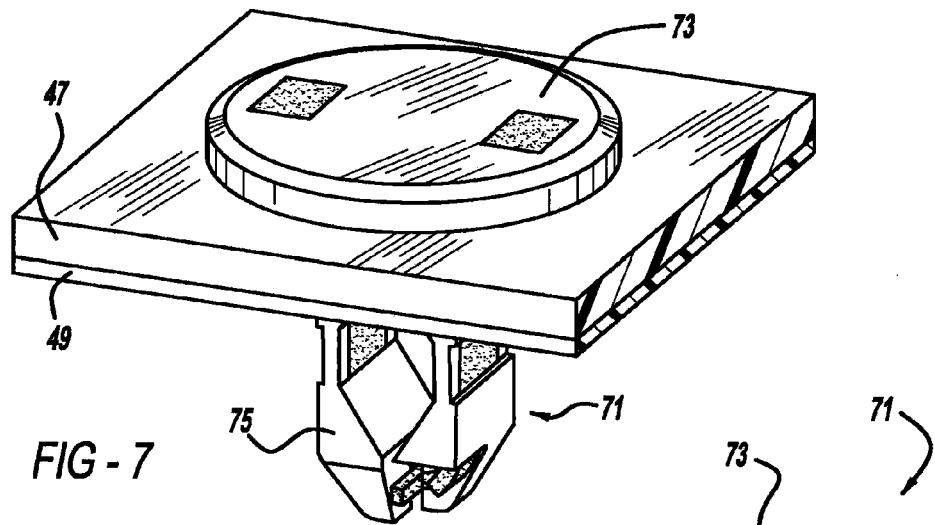
FIG. 7 is a perspective view showing another embodiment fastener of the present invention inserted in workpieces.
Figure 8:
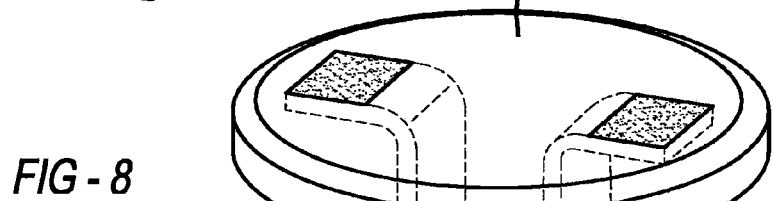
FIG. 8 is a perspective view showing the fastener of FIG. 7.
Figure 9:
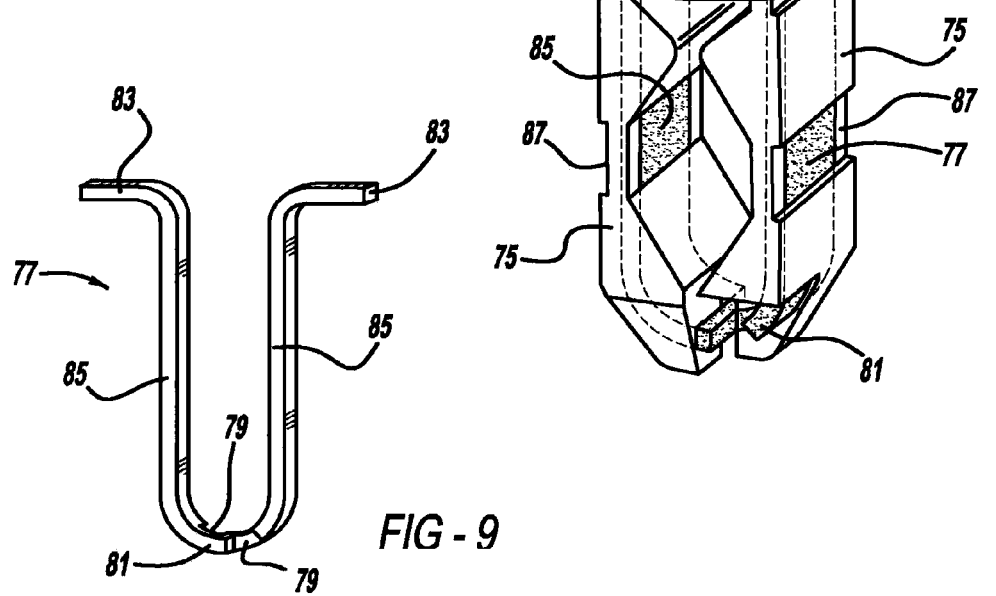
FIG. 9 is a perspective view of a shape memory material employed in the fastener of FIG. 7.
Figure 10:
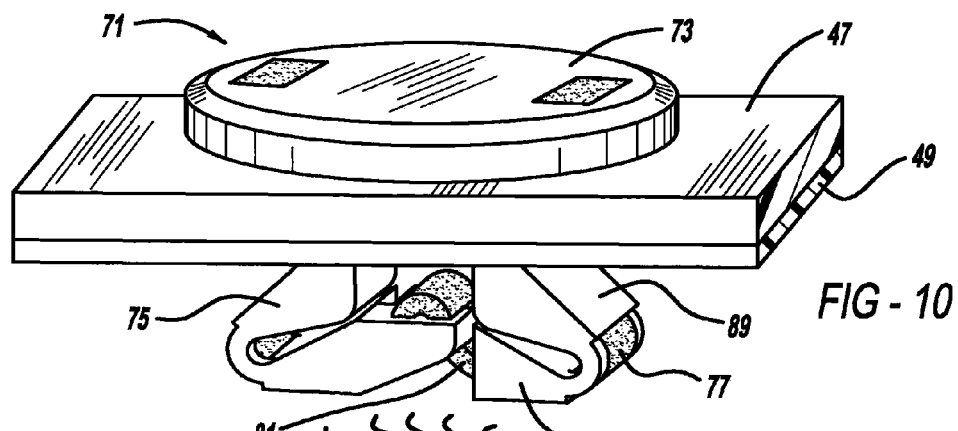
FIG. 10 is a perspective view showing the fastener of FIG. 7 in an actuated and workpiece-engaging condition.
Figure 11:
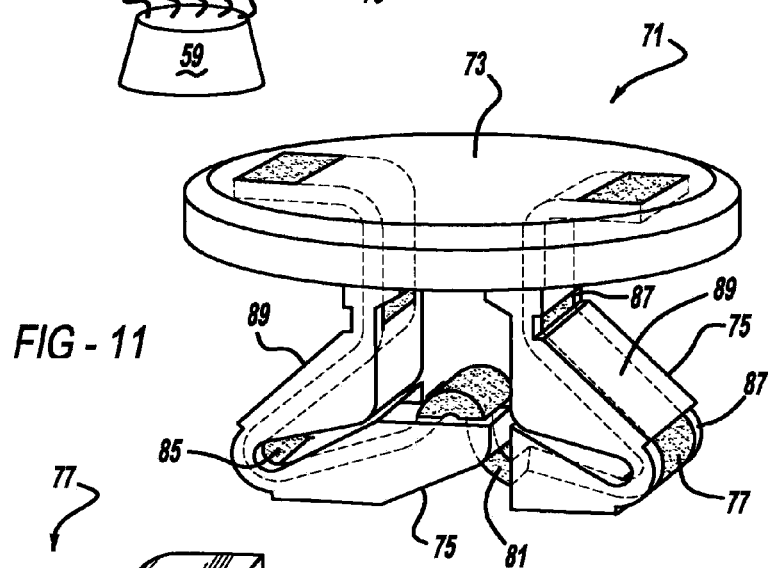
FIG. 11 is a perspective view showing the fastener of FIG. 7 in the actuated condition.
Figure 12:
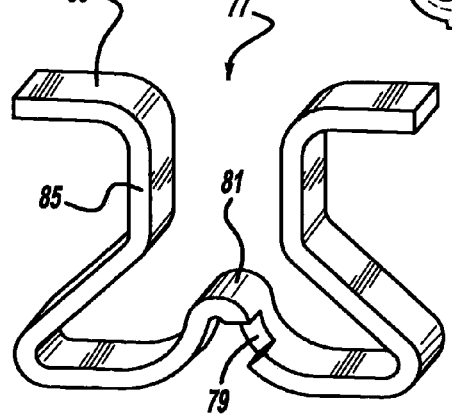
FIG. 12 is a perspective view showing the shape memory material employed in the fastener of FIG. 7 in the actuated condition.

In the free and molded state, fastener 71 has the straight leg configuration shown in FIGS. 7 and 8, to allow for easy insertion of the legs through a hole in workpieces 47 and 49. Upon actuation, however, trough 81 of smart member 77 tries to return to its memory position by upwardly folding while open gaps 87 in legs 75 control and allow for outward expansion of both the inactive material and smart member segment thereat, as can be observed in FIGS. 10 and 11. This allows workpiece-engaging surfaces 89 on the outer sections of legs 75 to contact and press against the underside surface of workpiece 49. Thus, smart member 77 takes on a somewhat hourglass or modified W-shape when in its actuated and "memory" condition. Again, it is noteworthy that the smart material is a minority of the total fastener weight and/or volume, and also is spaced away from the workpiece-engaging surfaces.

FIGS. 13a and 13b show another embodiment fastener 101 in a free, molded state and an actuated fastening state, respectively. Fastener 101 includes a laterally enlarged head 103 and a longitudinally extended stem, including a pair of flexible legs 105. A generally inverted-V-shaped smart material member 107 is insert molded completely internal to legs 105. In this exemplary embodiment, when legs 105 of fastener 101 are initially inserted into a hole 109 of workpieces 47 and 49, a radial gap is present between an outer periphery 111 and an internal surface defining a hole 109. In the actuated condition of FIG. 13b, however, smart material member 107 is energized by external actuator 59 and attempts to return to its flat "memory" position. Therefore, smart member 107 laterally expands width of periphery 111 to essentially fill up hole 109 of the workpieces while also outwardly expanding and angling legs 105 to compress adjacent portions of workpieces 47 and 49 between workpiece-engaging surfaces 113 of legs and an underside workpiece-engaging surface 115 of head 103.

Smart member 107 can alternately move workpiece-engaging surfaces 113 of legs 105 to a generally co-linear position essentially parallel to underside surface 115 of head 103. As shown in FIG. 13b, smart material 107 greatly increases the extraction forces required to remove the set and actuated fastener 101 from the workpieces. In this embodiment, smart member 107 is preferably a shape memory metallic alloy but may alternately be a shape memory polymer.

FIGS. 14a and 14b are similar to the prior embodiment, except that a smart material member 121 is positioned along an in-seam of legs 123. Hence, smart member 121 is externally exposed from a fastener 125, however, it is still spaced away from the workpiece-engaging surfaces. This configuration is advantageous since insert molding is not required and smart material member 121 can simply be adhesively bonded, slid within molded grooves, or have sonically welded or heat staked posts of the inactive polymer legs attached thereto. This also beneficially allows direct exposure of an entire surface of the smart material member to external energy source 59.

Figure 15:
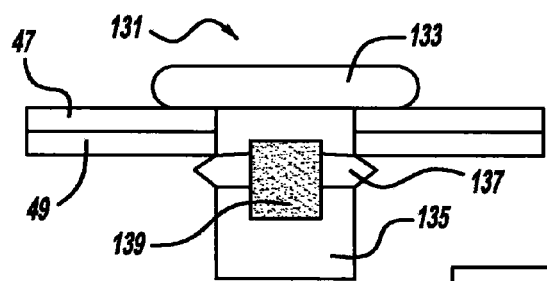
FIG. 15 is a diagrammatic side view showing another embodiment fastener of the present invention inserted in workpieces.
Figure 16:
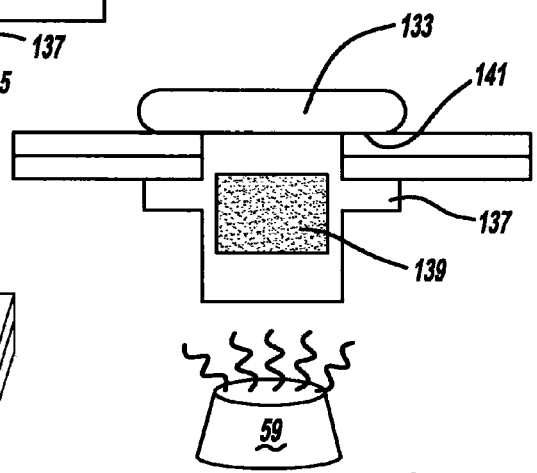
FIG. 16 is a diagrammatic side view showing the fastener of FIG. 15 in an actuated and workpiece-engaging condition.

Another embodiment fastener 131 is illustrated in FIGS. 15 and 16. In this embodiment, fastener 131 has a laterally enlarged head 133 and a longitudinally extending stem 135 perpendicularly projecting therefrom. An annular barb 137, semi-circular detent or other protruding formation is located on stem 135 on the opposite side of workpieces 47 and 49 from the head. A smart material member 139 is insert molded or otherwise placed into the middle of stem 135 prior to insertion of fastener 131 into the workpieces. Upon actuation, smart material member 139 laterally expands which also serves to laterally push barb formation 137 outwardly to provide additional contact against an underside of workpiece 49 opposite workpiece engaging surface 141 of head 133. Optionally, slots may be provided to allow for the lateral expansion of the inactive polymeric or even metallic material of stem 135. It also envisioned that a different energization condition be later employed to reverse the movement of smart member 139 and barb formation 137. For example, if heat (e.g., greater than 125° C.) expands the smart member then an extremely cold condition (e.g., less than −40° C.) may contract the smart material so that fastener 131 can be more easily removed from the workpieces.

Figure 17:
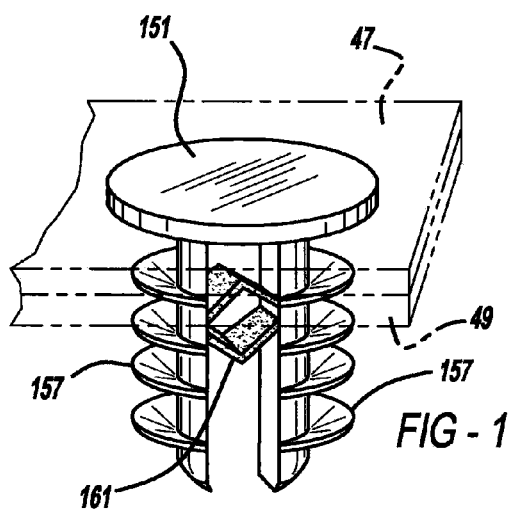
FIG. 17 is a perspective view showing another embodiment fastener of the present invention inserted in workpieces.
Figure 18:
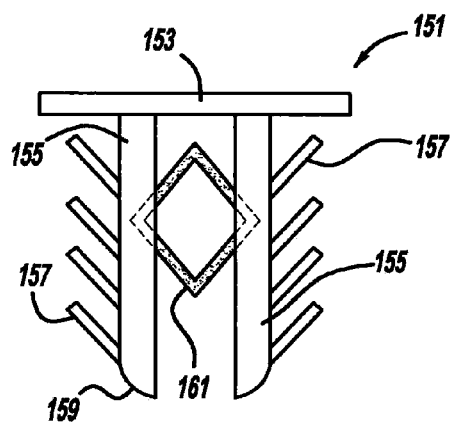
FIG. 18 is a diagrammatic side view showing the fastener of FIG. 17.
Figure 19:
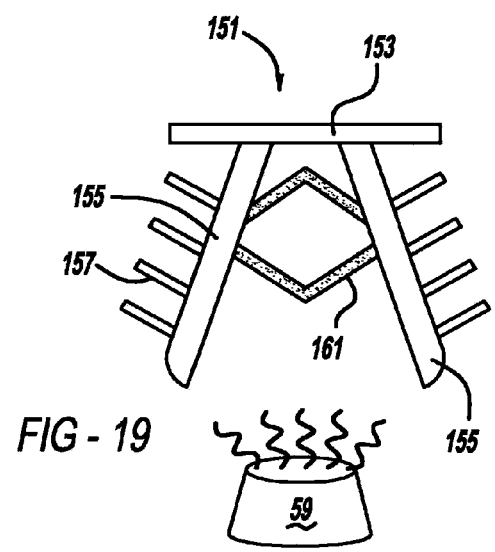
FIG. 19 is a diagrammatic side view showing the fastener of FIG. 17 in an actuated condition.

Still another embodiment fastener 151 can be observed in FIGS. 17-19. This fastener includes a laterally enlarged head 153 and a stem defined by a pair of spaced apart legs 155. Multiple branches 157, each having a flexible and semi-conical shape extend from an outside surface of each leg, are downwardly pointed toward a distal lead-in end 159 of fastener 151. This creates a Christmas tree-like configuration. Head 153, legs 155 and branches 157 are all injection molded from an inactive polymeric resin. A smart material member 161 has a pair of opposed corners insert molded into a middle portion of legs 155 with intermediate sections bridging within a gap between the legs. Smart material member 161 is preferably shape memory metallic alloy, such as a pre-formed wire, which has a generally diamond shape in the unactuated and free condition. FIG. 19 illustrates the workpiece-engaging condition where external energy source 59 actuates smart member 161 so that it tries to return to its memory shape. In this situation, smart member 161 outwardly rotates legs 155 relative to head 153 to more firmly engage branches 157 against an underside of workpiece 49.

Referring to FIGS. 20 and 21, a fastener 171 includes a flexible and elongated body or band 173 with opposite ends thereof. One end has a male attachment formation 175 projecting therefrom while an opposite end has a female receptacle attachment formation 177 formed thereon. A generally C cross-sectionally shaped smart material member 179 is located within inactive outer housing 180 of receptacle 177 with a central opening accepting insertion of male attachment formation 175.

Upon energization, smart material 179 within female receptacle 177 constricts to firmly press against and attach to male formation 175. This serves to hold closed the ends of band 173 such that an internal workpiece-engaging surface 181, of generally circular shape, compresses against and holds together elongated workpieces 183 such as wires, cables, or hoses, as is shown in FIG. 21. It is noteworthy that all of body 173 and male attachment formation 175 are made of an inactive and non-shape memory material such as a polymeric resin or stamped spring steel. It is alternately envisioned that the smart material can be located on the male attachment formation to expand within a totally inactive material receptacle. It is also alternately envisioned that one or more detents, projections, depressions or knurl patterns can additionally be provided between smart material member 179 and male formation 175 to provide greater fastening friction.

FIGS. 22-24 illustrate a further embodiment fastener 191. This fastener has a flexible body defined by a pair of body-halves or legs 193 joined by a middle hinge 195 or handle outwardly projecting therefrom opposite distal, inwardly turned ends 197. Legs 193 and hinge 195 are completely molded from an inactive and non-smart material polymeric resin, is made from an inactive wire, or stamped from an inactive spring steel material. Curved internal workpiece-engaging surfaces 197 are created on legs 193 so as to contact against and hold an elongated, generally cylindrical workpiece 199, such as a tube, wire or cable, when ends 197 are closed as illustrated in FIG. 23. A smart material actuator member 201 has a generally uniform cross-section and somewhat oval top view shape with a through-bore 203 therein. Smart member 201 externally surrounds a section of hinge 195 such that when it is actuated, it pulls legs 193 toward each other so as to secure workpiece 199 therein.

Figure 25:
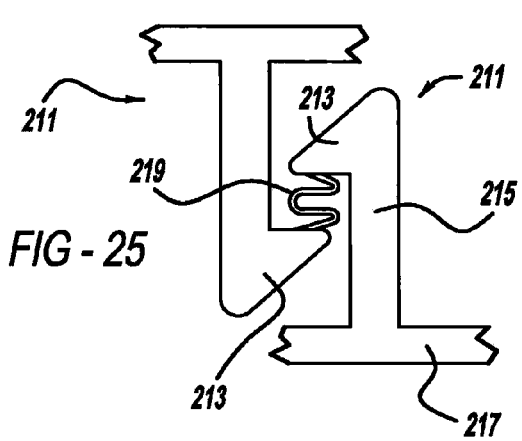
FIG. 25 is a diagrammatic side view showing another embodiment fastener of the present invention.
Figure 26:
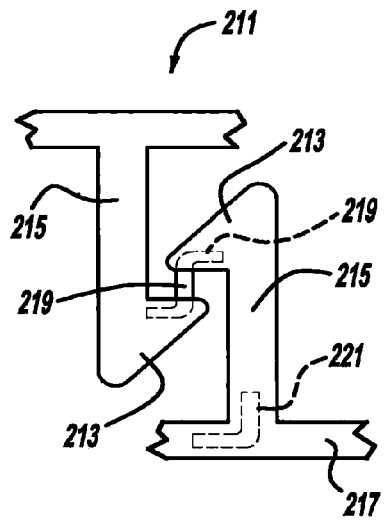
FIG. 26 is a diagrammatic side view of the fastener of FIG. 25 in an actuated condition.

Another fastener embodiment is shown in FIGS. 25 and 26. A pair of opposed snap-fit fasteners 211 each have an enlarged barb-like head 213 adjacent to an end of an elongated and flexible stem or shaft 215. Shaft 215 perpendicularly projects from a base component 217, such as a closure, trim panel, or other device. A smart material member 219 spans between barbs 213 in a folded or pleated free state when in the nominal, unactuated condition. Ends of smart member 219 are insert molded or otherwise attached internally to barbs 213. When energized as shown in FIG. 26, smart material member 219 constricts and pulls barbs 213 closer together and/or lessens movement between the snap-fit fasteners. The smart material is preferably metallic and the barb/shaft is preferably polymeric.

In an alternate variation, an L-shaped smart material member 221 is internally or externally positioned at the bend between base 217 and proximal end of shaft 215. Thus, when smart material member 221 is energized, it can stiffen or move to encourage, or alternately, deter flexure of the snap-fit relative to the base. Barb 213 and/or the adjacent section of shaft 215 can be configured to engage a workpiece, such as an edge or slot in a flat plate, box, moveable lid or the like. Thus, member 221 changes forces for snap fit-to-workpiece engagement and disengagement depending upon its energization state and the actuation characteristics of the smart member.

Figure 27:
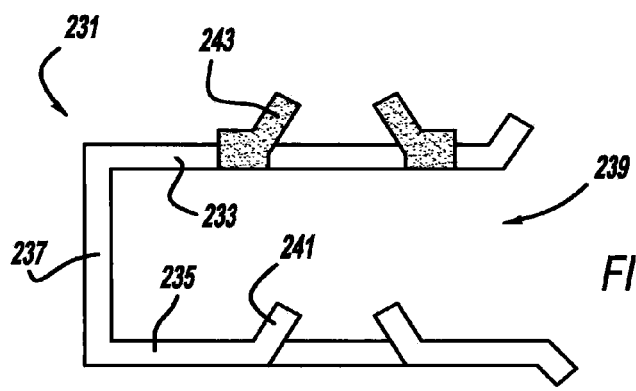
FIG. 27 is a diagrammatic side view showing another embodiment fastener of the present invention.
Figure 28:
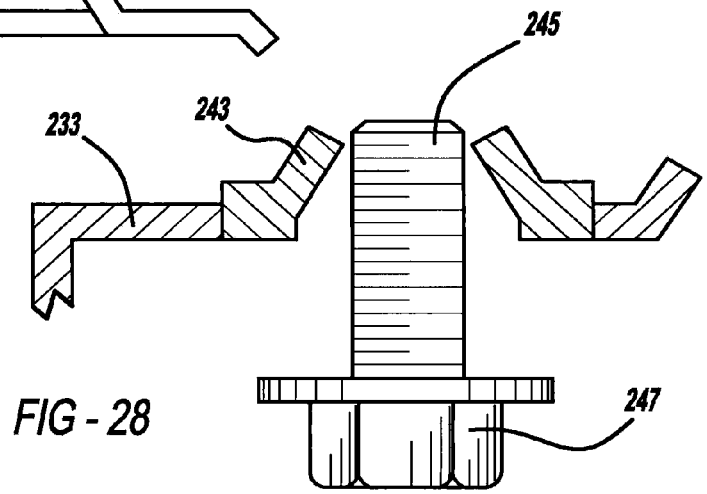
FIG. 28 is an enlarged and cross-sectional view showing a portion of the fastener of FIG. 27 with a bolt inserted therein.

Referring now to FIGS. 27-29, an additional embodiment fastener 231 has a pair of generally parallel legs or side walls 233 and 235 connected together by an end wall 237. An opposite open end 239 is provided to allow for insertion of one or more workpieces between walls 233 and 235, An inwardly turned annular flange 241 in wall 235 defines a hole therethrough which temporarily retains a bolt 247 prior to workpiece engagement. Coaxially aligned therewith, an outwardly turned annular nut or flange 243, made of shape memory metallic material, is internally located within inactive polymeric wall 233. When actuated, the smart material of flange 243 will inwardly expand to decrease the corresponding hole opening thereby firming engaging a threaded shaft 245 of bolt 247, or other male member extending therethrough. It is alternately envisioned that reverse energization will cause the smart material to return to its initial wider hole condition thereby allowing more easy removal of the threaded shaft.

Another embodiment fastener 261 is observed in FIGS. 31-33. Fastener 261 is of a push-nut variety including an inactive outer segment 263, having a generally flat annular shape, with four upturned and inwardly projecting teeth 265 extending therefrom. Slots 267 radially project from a central through-bore 269 and separate each adjacent pair of teeth 265. The teeth are formed to have a generally triangular configuration with tapered internal edges. The internal edges 271 are provided with a layer of smart material which can be actuated to move toward a male shaft 273 extending through the bore 269. When energized (see FIG. 31), the bore diameter is smaller and the tapered edges bite into and engage the workpiece shaft 273. Shaft can either be a polymeric or soft metallic member. It is preferred that fastener 261 be made from a stamped spring steel material with the smart material being a shape memory metallic alloy or polymer attached thereto. It is alternately envisioned that at least a portion or all of each tooth 265 can be made from the shape memory material although it is preferred that the inactive material be a majority of the fastener weight.

Referring to FIGS. 34-37, another embodiment fastener 291 includes a pair of predominantly parallel legs or side walls 293 and 295, connected by a deformable end wall 297. An open end 299 is positioned opposite end wall 297 to allow entry of one or more workpieces 301 therein between walls 293 and 295. An internally threaded boss or nut 303 extends from or is insert molded in inactive polymeric wall 293. An annular collar 305 is insert molded in and projects from inactive polymeric wall 295 coaxial with nut 303. When actuated, a threaded shaft 307 of a bolt 309 engages with nut 303 and projects through a hole 311 inside workpiece 301 in a clevice-like configuration, as shown in FIG. 37.

A smart material member 313 is only located adjacent end wall 297. Preferably, smart material 313 is a pre-stamped, shape memory metallic alloy, a majority of which is insert molded within inactive polymeric end wall 297. The end and side walls are injection molded as a single piece and end wall 297 may have thinned sections to encourage its flexure. Nut 303 and collar 305 are preferably stamped metal of an inactive and non-shape memory nature. When actuated, as is shown in FIG. 37, smart material member 313 changes shape and moves end walls 293 and 295 to sandwich against and compress outer surfaces of workpiece 301 therebetween, whereafter bolt 309 is fully inserted. This type of fastener can be attached to either thin or thick, single or multiple workpiece panels, since the smart material member will simply compress the walls to whatever thickness the workpiece(s) allow. Alternately, the smart material member can be entirely externally placed on end wall 297.

Figure 38:
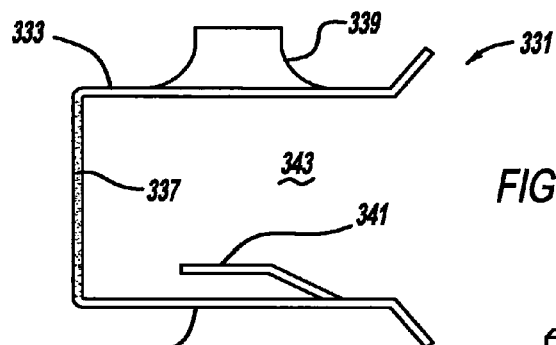
FIG. 38 is a diagrammatic side view showing another embodiment fastener of the present invention.
Figure 39:
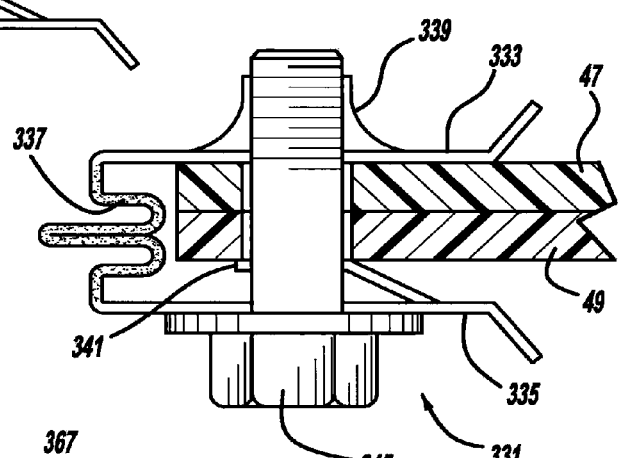
FIG. 39 is a diagrammatic side view showing the fastener of FIG. 38 in an actuated and workpiece-engaging condition.

FIGS. 38 and 39 illustrate still another embodiment fastener 331. Fastener 331 is preferably an all metal stamped U-clip having a pair of generally parallel legs or sidewalls 333 and 335 connected by a smart memory material end wall 337. An integral and internally threaded boss or nut 339 is provided in wall 333 and an internally offset tongue 341 extends from wall 335. Workpieces 47 and 49 extend through an open end 343 of fastener 331 and are compressed between workpiece-engaging surfaces of tongue 341 and wall 333. The side walls and tongue are all made of inactive and non-smart material. Upon activation, smart material end wall 337 moves from a generally straight configuration (FIG. 38) to a folded configuration (FIG. 39) thereby moving side walls 333 and 335 toward each other. A threaded bolt 345 is thereafter inserted in a clevis-like manner.

Figure 40:
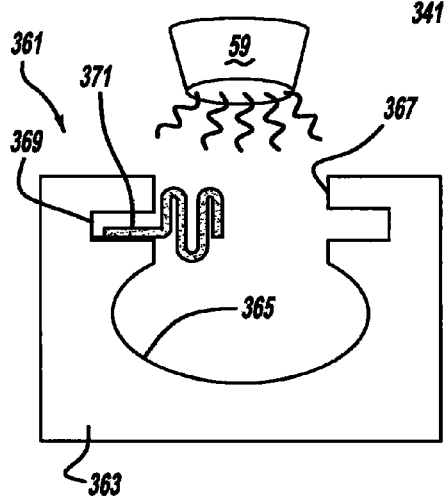
FIG. 40 is a diagrammatic side view showing another embodiment fastener of the present invention in an actuated and open condition.
Figure 41:
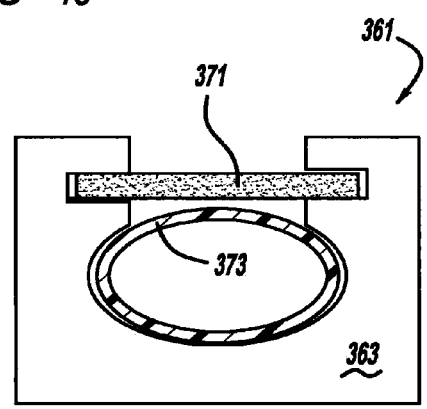
FIG. 41 is a diagrammatic side view showing the fastener of FIG. 40 in a closed and workpiece-engaging condition.

FIGS. 40 and 41 show a different embodiment fastener 361. In this embodiment, fastener 361 includes a generally rigid block 363, made of an inactive and non-smart material, such as a polymer. Block 363 has a curved internal surface 365 defining a central cavity. Block 363 additionally has an opening 367 and a laterally extending groove 369 between opening 367 and the cavity. A shape memory metallic alloy 371 has an outer surface adjacent one end which is adhered, riveted or otherwise attached within groove 369. Upon energization, the smart material retracts or folds to allow workpiece access through opening 367 and into the cavity defined by curved surface 365. When the energization has been removed, smart material 371 returns to its flat and straight memory position spanning across opening 367 to prevent removal of a tubular or wire workpiece 373 within the cavity. Additionally, laterally extending flanges may be provided on the block to allow for it to be screwed or otherwise mounted to another workpiece or a structural member such as a factory wall or pillar.

Figure 42:
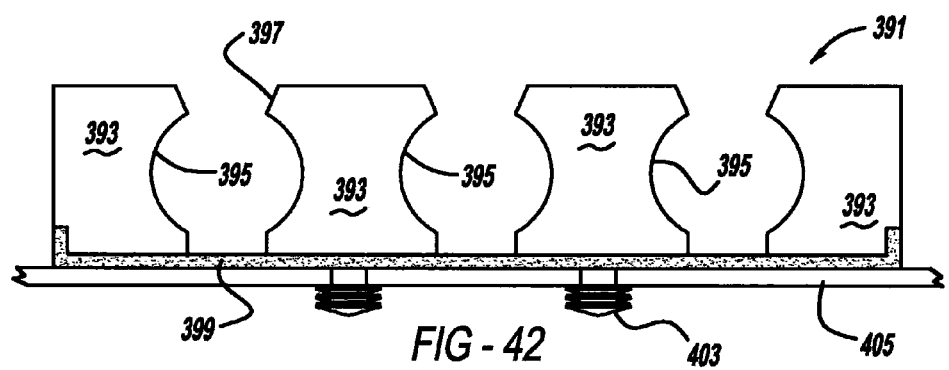
FIG. 42 is a diagrammatic side view showing another embodiment fastener of the present invention.
Figure 43:
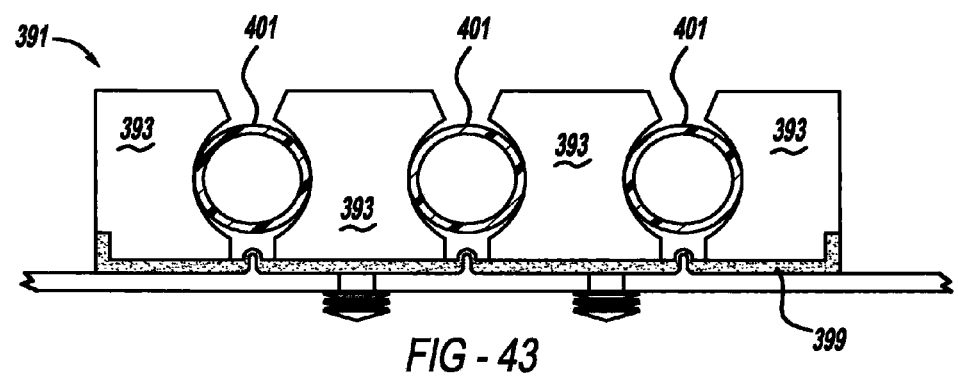
FIG. 43 is a diagrammatic side view showing the fastener in FIG. 32 in an actuated and workpiece-engaging condition.

A further fastener embodiment is shown in FIGS. 42 and 43. Fastener 391 includes at least four generally rigid blocks or bodies 393 each having at least one curved workpiece-engaging surface 395 accessible by an opening 397. Adjacent pairs of the blocks are connected by a smart memory material member 399 which moves the blocks toward each other when energized so as to clamp around elongated and cylindrical tube or wire workpieces 401. Barbed stems 403 or screws optionally secure blocks 393 to a workpiece panel 405 or the like. The blocks are made from an inactive and non-shape memory material such as a polymer while the smart material can be made from a metallic alloy, or alternately, a shape memory polymer. It is alternately envisioned that energization can cause the blocks to move apart instead of or in addition to the preferred energization of the shape memory material for compression.

Figure 44:
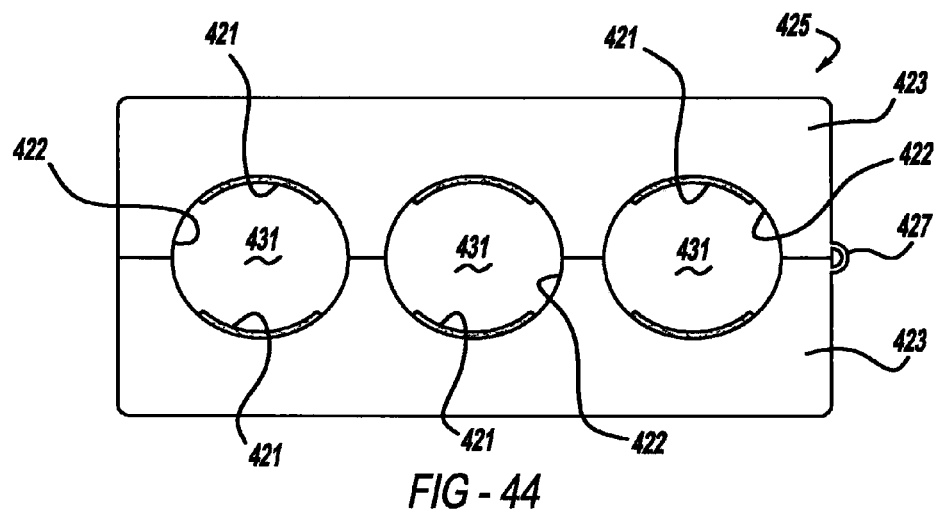
FIG. 44 is a diagrammatic side view showing another embodiment fastener of the present invention.

Reference should now be made to FIGS. 44 and 45 wherein a fastener 425 uses a smart material 421, preferably a shape memory polymer attached to an internally curved surface of each inactive polymeric housing, body or block 423. A pair of blocks 423 are moveable in a clam shell manner from an open and internally accessible position to a closed position as shown in FIG. 44. A living hinge 427, or alternately a piano hinge, couples together the two blocks. A cotter pin and loop, snap fit or other openable latch can optionally connect the side of fastener 425 offset hinge 427. After tube or wire workpieces 429 are inserted within each cavity 431, and the blocks are locked shut, the external energization source 59 endothermically, photonically, vibrationally or electrically actuates the shape memory foam material 421 that radially expands inward by at least 200% to fill up the space while also centering the workpiece 429 relative to curved internal surface 422. This advantageously self-centers the tube within the cavity and also self-adjusts for different workpiece diameters within the cavity.

FIGS. 46 and 47 illustrate another embodiment fastener 451 which is a router for wire, cable or tube workpieces 453. A shape memory polymeric foam 455 is attached to an inside surface 457 of a lid or body 459. A hinge 461 and opposite latch is provided to close fastener 451 after the workpieces have been loosely inserted therein. Upon external endothermic, photonic, vibration or electric energization, foam 455 expands by at least 200% to fill up the majority of the internal cavity 463 inside fastener 451 thereby pushing against an external surface of each workpiece 453 and pushing the workpieces against the opposite internal surface 465 of the opposite body or housing 467 of fastener 451. This advantageously allows for the securing of randomly laying workpieces within fastener 451, but without requiring harmful isocyonide-based reaction injection molded materials. Additionally, mounting flanges may be provided to screw fastener 451 to an adjacent workpiece or factory wall.

Referring to FIGS. 48-51, a fastener 581 includes a body 583, upstanding side walls 585, and inwardly angled and diagonally projecting legs 587. Legs 587 flexibly move relative to side walls 585 and have an opening 589 between ends thereof to allow a workpiece 591, such as an elongated tube or wire, to be inserted therebetween for receipt within a receptacle 593. Body 583, walls 585 and legs 587 are all injected molded or extruded from an inactive polymeric material. Furthermore, an internal cradle 595 is made from an active, shape memory material. Cradle 595 includes a central semi-cylindrical segment 597 and distal ends 599. Cradle 595 defines a portion of receptacle 593 between body 583 and side walls 585. In a relaxed and unenergized state, as shown in FIG. 49, cradle 595 may optionally include elongated slots 601. When activated by an energy source 59, ends 599' of cradle 595 upwardly expand into the otherwise open space 603 between each leg 587 and adjacent wall 585. Ends 599' may also be expanded between optional internal ribs 605 attached to legs 587 and walls 585. This expansion of the activated cradle 595 serves to deter flexure of each leg 587 toward adjacent wall 585 thereby locking legs 587 into their workpiece securing positions. Body 583 of fastener 581 is secured to a different workpiece panel or member via screws, rivets, straps or other such supplemental attachments.

FIGS. 52 and 53 show a variation of the immediately preceding fastener. In this embodiment, a similar fastener 621 includes a body 623, side walls 625 and flexible legs 627, all of which are made from an active polymeric material. This embodiment does not include ribs. A cradle 629 is of a simpler design such as a semi-cylindrical shape, but without a slot. Cradle 629 is an energizable and active, smart material polymer which is expandable within a space 631 between each leg 627 and adjacent wall 625 in order to lock a workpiece 633 therein. This construction advantageously allows cradle 633 to swell and enlarge in size to accommodate different diameter workpieces within the fastener and to allow for axial sliding of workpiece 633 within fastener 621 prior to activation. Cradle 633 may be mechanically or adhesively bonded to body 623.

Reference should be made to FIGS. 54 and 55 for another embodiment fastener. This fastener 651 employs an active polymeric body 653, side walls 655 and inwardly angled and flexible legs 657. An elongated workpiece tube or wire 659 is inserted in a snap fit manner between distal ends of legs 657 and a receptacle 661 in body 653. A central stem 663 extends from body 653 and has a laterally enlarged head 665 on an end thereof. Stem 663 and optionally head 665, are injected molded from a smart memory polymer. An installer initially inserts head 665 into a generally elongated and oval aperture 667 within an inner sheet metal workpiece 669, which is spaced away from an outer sheet metal workpiece 671, which makes this a blind attachment. The installer then rotates the fastener 651 approximately 90° such that enlarged and generally oval head is turned to position 665' offset from the elongation direction of aperture 667. An energy source then activates the shape memory material of stem 663 and optionally head 665 so that they enlarge and securely compress against the back side of inner panel 669. This fastener construction provides a quarter turn fastener as a single piece component which can be applied to workpiece panels of varying thickness. In one alternate arrangement, activation of the shape memory material may automatically cause the 90° rotation of head 665 such that it does not need to be manually performed. In another alternate variation, an optional finger 681 can laterally extend from body 653 to engage with a mating hole in panel 669, thereby deterring reverse rotation of fastener 651 after it is in the fully attached position.

FIGS. 56 and 57 illustrate yet another embodiment fastener 701 which can be used to maintain an automotive vehicle, interior trim panel workpiece (not shown) to a sheet metal workpiece panel 703 or the like. Fastener 701 includes a laterally enlarged and generally circular head 705, a frusto-conical umbrella 707 and a hollow stem 709 longitudinally projecting perpendicular to head 705. A separate plunger 711 has a proximal end movable within the hollow cavity of 709 and further includes a bulbous head 713 at an opposite distal end thereof. Head 705, umbrella 707, stem 709 and plumber 711 are all injection molded from an inactive polymeric material. A smart member 715 is injection molded onto outside surfaces of stem 709 and plunger 711 as a pre-assembled component. In its relaxed state, smart member 715 has a substantially cylindrical outside surface 717 with a laterally extending ring 719 annularly projecting from a middle thereof generally parallel to head 705. When inserted into the aperture 721 of workpiece panel 703, ring 719 can be flexed therethrough when the plunger 711 and smart member 715 are fully extended and relaxed. But when activated by an energy source 59, as shown in FIG. 57, smart member 715 longitudinally contracts while laterally expanding on the back side of workpiece panel 703. Smart member 715 also seals aperture 721 while causing plunger 711 to retract into the hollow receptacle of stem 709. In turn, bulbous end 713 and plunger 711 laterally and outwardly push distal ends of stem 709 thereby provided an additional mechanical force to retain fastener 701 to workpiece panel 703. It is alternately envisioned that plunger 711 can be made of an active shape memory material while member 715 can be an inactive PVC or other flexible covering material.

As can be observed in FIGS. 58 and 59, another embodiment fastener 751 secures an elongated and generally cylindrical workpiece 753, such as a tube or wire, to a sheet metal workpiece panel 755. Fastener 751 includes a predominantly cylindrical head 757 which serves to clamp elongated workpiece 753 therein. The fastener further includes an intermediate post 759, generally frusto-conical umbrella 761, longitudinally elongated stem 763, and at least a pair of flexible legs 765. Umbrella 761 and stem 763 are made from an active, shape memory polymer while the remainder of fastener 751 is integrally formed by injection molding from an inactive polymeric material. Thus, after fastener is inserted within an aperture of workpiece panel 755, external energy source 59 energizes the smart material thereby causing expansion of umbrella 761 and/or contraction of stem 763. This allows fastener 751 to tightly sandwich workpiece panel 755 between umbrella and ends of legs 765, thereby accommodating different thickness and/or quantities of workpiece panel 755 without requiring a multitude of differently sized fasteners. This saves part handling and installation inaccuracies within an assembly plant, while also reducing the cost and complexity of manufacturing many differently sized but otherwise similarly appearing fasteners.

Figure 62:
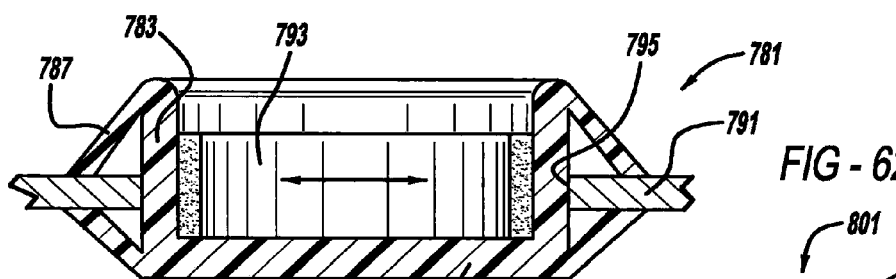
FIG. 62 is a cross-sectional view like that of FIG. 61, showing the fastener, in an activated state.

Turning now to FIGS. 60-62, grommet fastener 781 employs a hollow, annular body 783 with a generally flat bridging bottom wall 785. A pair of flexible and opposed frusto-conical legs 787 diagonally and outwardly extend from body 783. A central annular groove 789 is defined between distal edges of legs 787 to receive a sheet metal workpiece panel 791 therein. An annular smart member 793, made from a shape memory alloy metal or polymer, is pressfit or adhered inside body 783. When energized by source 59, smart member 793 laterally expands as shown in FIG. 62, thereby pushing body 783 against an aperture of workpiece panel 791 defining an aperture 795 therein. Body 783 and wings 787 are preferably made from a non-active material, such as an elastomeric polymer or rubber, thereby providing a water-tight an air-tight seal for aperture 795.

Figure 63:
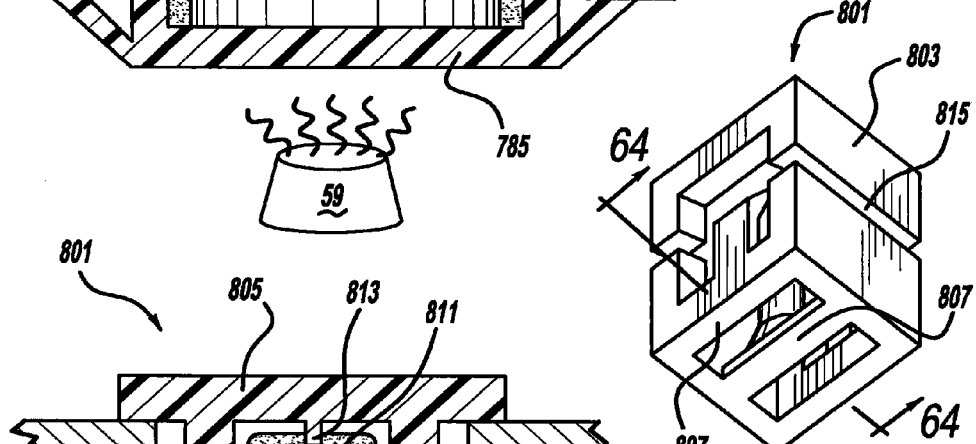
FIG. 63 is a perspective view showing another embodiment fastener of the present invention.
Figure 64:
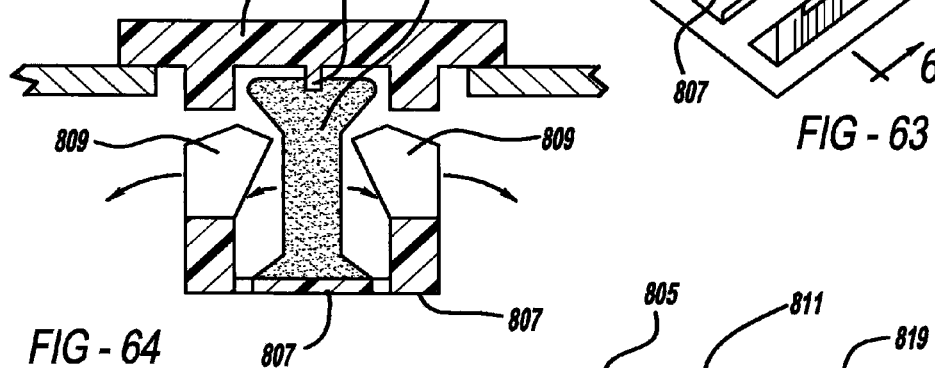
FIG. 64 is a cross-sectional view, taken along line 64-64 of FIG. 63, showing the fastener, in a relaxed state.
Figure 65:
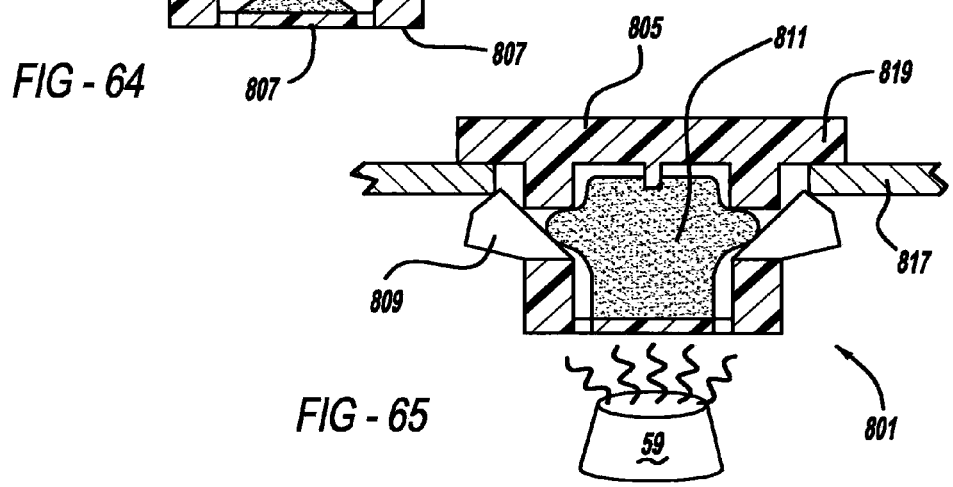
FIG. 65 is a cross-sectional view like that of FIG. 64, showing the fastener, in an activated state.

A different embodiment fastener 801 is illustrated in FIGS. 63-65. This fastener 801 has a somewhat box-like and cubicle shape defined by side walls 803, top wall 805 and bottom walls 807. A flexible leg 809 is upstanding from bottom wall 807 between side walls 803 at each side thereof. Furthermore, a shape memory alloy actuator 811 is connected to a post 813 extending from top wall 805 and oppositely mechanically or adhesively bonded to bottom wall 807 such that it projects in a longitudinal manner between legs 809. When energized by an external source 59, shape memory actuator 811 longitudinally retracts and laterally expands thereby causing the bottom of fastener 801 to move toward the top wall (an optional weakened area or gap 815 may be provided in the side walls to allow for such movement) while the lateral expansion outwardly pushes legs 809 past a nominal outside of fastener 801. This serves to trap one or more workpieces 817 between an overhanging head 819 extending from top wall 805, and distal ends of flexible legs 809.

A variation of the preceding fastener 801 is shown in FIG. 66. This exemplary fastener 851 includes a top wall 853 and overhanging head 855, as well as bottom walls 857 and flexible legs 859. However, a generally hourglass-shaped smart actuator 861 consists of a shape memory alloy, metallic spring-like member, which is pinned to top wall 853 and mechanically (e.g., insert molded) or adhesively attached to bottom wall 857. When activated, the hourglass shape will turn into a longitudinally compressed and laterally expanded diamond shape thereby outwardly flexing legs 859 into engagement with a back side of a workpiece 863.

Referring to FIGS. 67 and 68, another embodiment fastener 881 is used to secure an elongated workpiece such as a tube or wire bundle 883 to a sheet metal workpiece panel 885. Fastener 881 includes a laterally elongated central body 887 and multiple spaced apart and offset legs 889 and 891 arcuately extending from lateral edges of body 887. Fastener 881 additionally includes a longitudinally elongated stem 893 with multiple frusto-conical, Christmas tree-like barbs or branches 895 outwardly projecting therefrom for engagement with a back side of workpiece panel 885. Stem 893 and branches 895 are injection molded from an inactive polymer while legs 891 are molded from a shape memory polymer or metallic alloy as one piece with stem 893 and branches 895. In its relaxed state, as shown in FIG. 67, legs 889 and 891 are arcuately curved but spaced apart in an open condition allowing access by workpiece 883. But when activated by an external energy source, wings 889 and 891 curl toward each other in an interlocking manner as shown in positions 889' and 891' in FIG. 68, thereby collectively encircling workpiece 883 therein. It is alternately envisioned that the encircled retention position can be in a relaxed state while the activated position can be the open state. As another alternate variation, wings 889 and 891, and body 887 can be integrally made from an inactive material along with stem 893 and branches 895, however, wings 889 can be internally and/or externally coated with a shape memory alloy polymer to cause the energized movement of the wings, although certain functional advantages may not be fully achieved with this coating approach.

Reference should now be made to FIGS. 69 and 70. This embodiment fastener 901 provides a nut-like head 903 from which laterally extends shape memory polymer or alloy legs 905 in a somewhat curved and axial manner. A rim 907 and attached base 909 are attached to distal ends of legs 905. More specifically, nut-like head 903 is longitudinally elongated above the generally flat base 909 and has a hollow inner cavity 911. The surface defining inner cavity 911 can have internal threads, barbs or other projecting surface formations to engage with a mating weld stud 913, having external threads or other enmeshing patterns. Weld stud 913 is welded onto a sheet metal workpiece panel 915, such as an automotive vehicle component, computer housing, electrical component, or the like. Thus, nut-like head 903 is press-fit or rotatably screwed onto weld stud 913. Moreover, nut-like head 903 and base 909 are preferably made from an inactive metal or polymeric material such that when legs 905 are energized, they act to center base 909 relative to nut-like head 903, weld stud 913, and workpiece panel 915. Legs 905 also act like floating springs. Base 909 serves as a functional component, such as an attachment bracket, or may be attached to a functional component. Alternately, weld stud 913 can be replaced by a bolt, axle or other projecting shaft.

FIG. 71 shows a fastener 931 which serves to attach together two spaced apart workpiece panels 933 and 935. Fastener 931 includes a central body 937 made of a smart memory polymer. Furthermore, fastener 931 includes a pair of spaced apart umbrellas 939, longitudinally elongated shafts 941 coaxially aligned with body 937, and arrowhead-shaped flexible legs 943 extending from a distal end of each shaft 941. Legs 943, shaft 941 and/or umbrella 939 can be made from a shape memory polymer or alloy, or from an inactive polymer. Thus, when energized, the smart material contracts thereby snugly sandwiching each workpiece panel between the adjacent umbrella and legs while also causing contraction of body 937 so as to firmly secure together workpieces 933 and 935.

FIGS. 72 and 73 show yet another embodiment fastener 961. This fastener acts like a blind rivet when energized. Fastener 961 includes an inactive rivet head 963 and inactive rivet body 965 which both have generally cylindrical exterior surfaces. Body 965 further includes a hollow internal receptacle 967 and external expansion slot 969 such that body can be split apart into legs 971 as shown in FIG. 73. A mandrel 973 has an elongated cylindrical shaft 975 and a tapered shoulder 977 adjacent a pointed head 979 thereof. When energized from source 59, mandrel 973 retracts within receptacle 967 of rivet body 965, which causes shoulder 977 of mandrel 973 to outwardly push legs 971 of rivet body 965 into back side engagement with one or more workpiece panels 981. Such a smart material actuated blind rivet can be used to secure together components in an automotive vehicle, aircraft, or electronic housing, especially as a temporary tacking rivet if the smart material movement is reversible through another energization change.

Referring now to FIGS. 74 and 75, a fastener 1001 is used to secure together one or more elongated workpieces, such as hollow tubes or wires 1003, to a building or vehicular panel. Fastener 1001 includes a base 1005, a pair of outer side walls 1007, a pair of diagonally and inwardly angled snap legs 1009, and a pair of workpiece receptacles 1011 of generally semi-cylindrical shape. A central pivot 1013 upstands from a center of base 1005 upon which is mounted a generally S-shaped head 1015. Head 1015 has laterally extending bridges 1017 terminating in tapered hooks 1019. When rotated from an open condition shown in FIG. 74, to a locked condition of FIG. 75, hooks 1019 engage within an associated open space 1021 between associated snap leg 1009 and outer wall 1007, such that bridge 1017 spans across each elongated workpiece 1003. Head 1015 and/or pivot 1013 are made from a shape memory alloy or shape memory polymer such that when they are energized, they automatically rotate between open and closed positions, or vice versa. The remainder of fastener 1001 is made from an inactive polymeric material and can be screwed or otherwise attached to the associated workpiece panel adjacent base 1005.

Yet another fastener construction can be observed with reference to FIGS. 76-81. This exemplary fastener 1031 is used to fasten an interior trim panel, circuit board or other workpiece panel 1033 to a vehicular body panel, computer housing or other such structural workpiece panel 1035. Fastener 1031 includes a head 1037, a post 1039, a circular shoulder 1041, a generally frusto-conical umbrella 1043, a longitudinally elongated and generally cylindrical stem 1045, and fastening legs 1047. Head has a plurality of arms 1055 outwardly extending therefrom in a somewhat arcuate manner while having diagonally angled upper edge surfaces 1057. In their relaxed state as shown in FIGS. 76-80, these arms 1055 are contracted toward a longitudinal center line 1059 of fastener 1031 such that they can easily be inserted through a hole 1061 of workpiece 1033 which then sits on shoulder 1041. A keyway 1063 defines a segment of shoulder and is integrally formed as part of post 1039 and head 1037, which are all injection molded from a shape memory polymer. When energized, as shown in FIG. 81, arms 1057 radially extend outward to the position 1055' thereby overlapping and sandwiching workpiece panel 1033 between arms 1057 and shoulder 1041.

Legs 1047 preferably have a somewhat diamond shape terminating in a pointed upper end facing toward head 1037 and an undercut conical end 1071 opposite head 1037. Laterally pointed knees 1073 of each leg 1047 projects through longitudinally elongated slots 1075 in an outside of stem 1045. Legs 1047 and conical end 1071 are integrally injected molded from a shape memory polymer such that in their relaxed state, as shown in FIG. 80, they are laterally retracted and/or more pliable to allow for stem insertion through an aperture 1081 and workpiece panel 1035. Thereafter, when energized like FIG. 81, knees 1073 of legs 1047 outwardly move and/or become more rigid thereby compressing against a back side of workpiece panel 1035. Moreover, umbrella 1043 is preferably made from a smart memory polymer such that upon energization, it expands to further compress against a front side of workpiece panel 1035. Umbrella 1043 is press fit onto stem 1045 adjacent to a bottom surface of shoulder 1041. Shoulder 1041 and stem 1045 are preferably injection molded as a unitary single piece from an inactive polymeric material.

It is further envisioned that a shape memory material, such as that employed for any of the proceeding embodiments, can be used to secure alternately constructed fasteners to one or more workpieces. Such exemplary alternate fasteners are disclosed in U.S. Patent Publication Nos.: 2010/0098515 entitled "Attachment Fastener" which published on Apr. 22, 2010; 2009/0191025 entitled "Fastener" which published on Jul. 30, 2009; 2009/0066531 entitled "Device for Assembling Two Structural Elements" which published on Mar. 12, 2009; and 2008/0095592 entitled "Clamp for Joining an Add-On Piece to a Base" which published on Apr. 24, 2008. All of these patent publications are incorporated by reference herein.

While various embodiments have been disclosed herein, it should be appreciated that other modifications can be made. For example, multiple heads connected by intermediate necks can be provided on any of the fasteners. While an automotive vehicle and/or factory uses have been disclosed, it should be appreciated that any of these fasteners can be employed in automotive vehicles, factories, residential buildings, electronic housings, aircraft or other applications, although all of the present advantages may not be realized. Furthermore, additional or alternately shaped legs, stems, bodies and segments can be provided, although various advantages may not be achieved. It should also be appreciated that any feature from any of the disclosed fasteners can be employed with any of the other disclosed fasteners in an interchangeable manner, although certain benefits may not be realized. It is intended by the following claims to cover these and any other departures from the disclosed embodiments which fall within the true spirit of this invention.

The invention claimed is:
1. A fastener comprising:
a shape memory material and a non-shape memory material, the shape memory material being a minority of the total fastener materials;
an open ended workpiece-receivable receptacle defined by multiple walls, at least two of the walls including the non-shape memory material;
the shape memory material spanning between the at least two non-shape memory material walls in at least one activation condition, the shape memory material being located internal to only an end one of the walls;
the end wall connecting together ends of the non-shape memory material walls which project from the end wall, the linear distance of the end wall spanning between the non-shape memory material walls being greater than the size of a gap between the ends of the non-shape memory material walls when the fastener is in at least one activation condition, and activation of the shape memory material operably placing the receptacle in a fastening condition; and
the end wall spanning between the non-shape memory material walls including angled sections when the fastener is in at least one activation condition.

2. The fastener of claim 1, further comprising a threaded boss coupled to one of the non-shape memory material walls.

3. The fastener of claim 2, further comprising a threaded shaft, another of the non-shape memory material walls including a hole, and the shaft ending through the boss and hole to span across a central portion of the receptacle.

4. The fastener of claim 1, wherein the shape memory material pivots all portions of the non-shape memory material walls toward each other when the shape memory material is activated.

5. The fastener of claim 1, wherein the walls and a surface coinciding with the shape memory material define a substantially U-shape in at least one activation condition.

6. The fastener of claim 1, wherein the non-shape memory material walls defining the receptacle each have a partially substantially cylindrical cross-sectional shape.

7. The fastener of claim 1, wherein the receptacle is adapted to secure at least one of a tube or wire therein when the walls are moved together.

8. The fastener of claim 1, wherein the non-shape memory material walls are polymeric, and the shape memory material is metallic and includes at least four straight and offset angled sections when in a non-energized condition.

9. The fastener of claim 1, wherein activation of the shape memory material changes the size of the gap between the ends of the non-shape memory material walls.

10. The fastener of claim 1, wherein the angled sections of the end wall form a V-shape.

11. The fastener of claim 1, wherein the angled sections of the end wall unbend when the shape memory material is activated.

12. The fastener of claim 1, wherein the end is of the non-shape memory material and includes a bent section when the energization state of the shape memory material is unchanged.

13. A fastener comprising:
an end and at least two elongated workpiece-engaging surfaces extending away from the end, a gap located between the surfaces, at least one actuator including a shape memory material changing a fastening condition of the workpiece-engaging surfaces when an energization state changes, the workpiece-engaging surfaces and a portion of the end spanning the gap being of a non-shape memory material which is substantially neutral to the energization state change; and
an internally threaded formation attached to at least one of the workpiece-engaging surfaces configured to receive a threaded shaft spanning between the workpiece-engaging surfaces to create a clevis structure, the formation including a cylindrical portion projecting from a wall including the at least one of the workpiece-engaging surfaces;
wherein the shape memory material and the end spanning the gap both include offset angled sections when the shape-memory material is in an energization state condition.

14. The fastener of claim 13, wherein the workpiece-engaging surfaces are part of at least first and second walls coupled together by the end, a majority of the walls are substantially parallel to each other and the gap between the walls is externally accessible from a side opposite the end, the shape memory material is only located at the end so as to change the spacing of the walls at the end when actuated, the shape memory material contacts against the end, and a portion of the non-shape memory material is located between the gap and the shape memory material.

15. The fastener of claim 13, wherein the energization state change includes photonic energy actuating the shape memory material to move the surfaces.

16. The fastener of claim 13, wherein the energization state change includes electrical energy actuating the shape memory material to move the surfaces.

17. The fastener of claim 13, wherein the end is a wall which includes the shape memory material located internally therein.

18. The fastener of claim 13, further comprising at least one workpiece located in the gap between the surfaces and externally extending through an open end in the fastener opposite the end wall.

19. The fastener of claim 13, wherein the end and the surfaces are a single piece with a majority of the fastener being of the non-shape memory material.

20. The fastener of claim 13, wherein:
the shape memory material is internal to the non-shape memory material at the end; and
the first and second walls entirely consist of the non-shape memory material.

21. The fastener of claim 13, wherein a portion of the end has a V-cross sectional shape in at least one configuration.

22. The fastener of claim 13, wherein angled sections of non-shape memory material unbend when the shape memory material is energized.

23. A fastener compromising:
an end and at least two elongated workpiece-engaging surfaces extending away from the end, a gap located between the surfaces, a shape memory material changing a fastening condition of the workpiece-engaging surfaces when an energization state changes, the workpiece-engaging surfaces being of a non-shape memory material;
the workpiece-engaging surfaces being part of at least first and second walls coupled together by the end, a majority of the walls being substantially parallel to each other in at least one condition, the gap between the walls being externally accessible from a side opposite the end, the first and second walls being entirely of the non-shape memory material, the entire and extending between the first and second walls, the first and second walls projecting from a first side of the end, and a second side of the end opposite the first side being free of projections of the non-shape memory material;
the first wall being entirely pivoted in a single direction in response to the energization state change of the shape memory material; and
the end being of the non-shape memory material and including a bent section when the energization state of the shape memory material is unchanged.

24. The fastener of claim 23, further compromising an internally threaded formation attached to at least one of the walls, and a threaded shaft insertable within the formation and spanning between the workpiece-engaging surfaces to create a clevis structure.

25. The fastener of claim 23, wherein the shape memory material is only located at the end so as to change the spacing of the walls at the end when actuated.

26. The fastener of claim 23, wherein the energization state change includes photonic energy actuating the shape memory material to move the surfaces.

27. The fastener of claim 23, wherein the energization state change includes electrical energy actuating the shape memory material to move the surfaces.

28. The fastener of claim 23, wherein the end includes the shape memory material, and the end and the workpiece-engaging surfaces are metallic.

29. The fastener of claim 23, further comprising:
at least one flat panel-workpiece located in the gap between the surfaces and externally extending though an open end in the fastener opposite the wall;

a middle portion of the shape memory material being prevented from contacting the workpiece in the gap by the non-shape memory material being located therebetween; and the shape memory material including a straight section and an offset angled section adjacent the end.

30. The fastener of claim 23, further comprising a cylindrical nut projecting from and being attached to the first wall, and a thread internally located in the nut, wherein the end and the workpiece-engaging surfaces are a single piece with a majority of the fastener being of the non-shape memory material.

31. The fastener of claim 23, wherein the end is an inactive polymeric material that flexes in response to a shape change by the shape memory material molded at least partially within the end polymeric material.

32. The fastener of claim 23, wherein the portion of the end wall spanning between the non-shape memory material walls includes angled sections when the fastener is in at least one activation condition.

33. The fastener of claim 23, wherein the bent section of end unbends in response to the energization state change of the shape memory material.

34. A fastener comprising:

an end wall and at least two elongated workpiece-engaging walls extending away from the end wall, a gap located between the workpiece-engaging walls, a shape memory material changing a fastening condition of the workpiece-engaging walls when an energization state changes, the workpiece-engaging walls being entirely of a non-shape memory material which is substantially neutral to the energization state change, the entire end wall extending between the workpiece-engaging walls, the workpiece-engaging walls projecting from a first side of the end wall, and a second side of the end opposite the first side being free of projections of the non-shape memory material; and a boss comprising an internal thread, with multiple thread turns, being attached to a first of the workpiece-engaging walls;

wherein an entirety of each of the workpiece-engaging walls is adapted to sandwich against outer surfaces of a workpiece therebetween when the shape memory material energization state changes;

wherein a majority of the workpiece-engaging walls are substantially parallel to each other in at least one condition and the gap between the workpiece-engaging walls is externally accessible from a side opposite the end wall;

wherein the shape memory material is only located at the end wall so as to change the spacing of the workpiece-engaging walls at the end wall when actuated;

wherein the end wall and the workpiece-engaging walls are a single piece with a majority of the fastener being of the non-shape memory material; and wherein the shape memory material and the end wall both include an offset angled bend or fold in at least one energization condition.

35. The fastener of claim 34, further comprising at least one workpiece located in the gap between the workpiece-engaging walls and externally extending through an open end in the fastener opposite the end wall.

36. The fastener of claim 35, further comprising a threaded shaft, one of the non-shape memory material walls including a hole aligned with the boss, and the shaft extending through the boss, workpiece and hole to span across a central portion of the gap, and the shape memory material is not exposed in the gap.

37. The fastener of claim 34, wherein the energization state change includes electrical energy actuating the shape memory material to move the surfaces.

38. The fastener of claim 34, wherein the end wall includes a curved section when the energization state of the shape memory material is unchanged.

39. The fastener of claim 38, wherein the curved section of end wall straightens in response to the energization state change of the shape memory material.

* * * * *